US00RE38982E

(19) United States
(12) Reissued Patent
Forte et al.

(10) Patent Number: US RE38,982 E
(45) Date of Reissued Patent: Feb. 14, 2006

(54) GAMBLING GAME SYSTEM AND METHODS

(75) Inventors: Steven L. Forte, Henderson, NV (US); Randy D. Sines, Spokane, WA (US)

(73) Assignee: Digideal Corporation, Spokane, WA (US)

(21) Appl. No.: 09/927,607

(22) PCT Filed: Oct. 13, 1995

(86) PCT No.: PCT/US95/12908

§ 371 (c)(1),
(2), (4) Date: Feb. 17, 1998

(87) PCT Pub. No.: WO96/35490

PCT Pub. Date: Nov. 14, 1996

Related U.S. Patent Documents

Reissue of:
(64) Patent No.: 5,934,998
Issued: Aug. 10, 1999
Appl. No.: 08/913,723
Filed: Feb. 17, 1998

(63) Continuation-in-part of application No. 08/439,687, filed on May 12, 1995, now Pat. No. 5,586,766, which is a continuation-in-part of application No. 08/242,229, filed on May 13, 1994, now abandoned.

(51) Int. Cl.
*A63F 1/18* (2006.01)

(52) U.S. Cl. ..... 463/12; 463/25; 463/26; 273/292; 273/309

(58) Field of Classification Search ..... 273/292, 273/274, 309; 463/12, 13, 42, 25, 46, 26, 463/27

See application file for complete search history.

(56) References Cited

U.S. PATENT DOCUMENTS 4,861,041 A * 8/1989 Jones et al. ..... 273/292
4,926,327 A * 5/1990 Sidley ..... 463/13

(Continued)

FOREIGN PATENT DOCUMENTS

EP 0338644 * 10/1989

OTHER PUBLICATIONS

Royal Calkins; "Blackjack introduced at Table Mountain"; Nov. 10, 1992, pp. B1 and B8; The Fresno Bee.*
John Huxley; "Progressive 21 Jackpot"; 1993; pp. i–v and 1–1 through 4–8.*
John Scarne; Scarne's Encyclopedia of Games; "Banking Card Games", Harper & Row Publishers, pp. 276–278.*
"The World's Greatest Gaming Catalog", Fall/Winter 1993, pp. 12, 14–15.*

*Primary Examiner*—Benjamin H. Layno
(74) *Attorney, Agent, or Firm*—Randy A. Gregory; Gregory I.P. Law

(57) ABSTRACT

A blackjack or other card game system having a plurality of player counters which count the blackjack hands or other player jackpot tally events dealt to players. The system also includes at least one dealer counter which counts the number of bust hands of the dealer or other dealer jackpot tally events. Displays are included for both the dealer and players to indicate the counts. The counters are typically zeroed at the end of each hand if a tally event has not occurred. Jackpots are awarded when the tally counts exceed predefined thresholds. A tabletop retrofit game system is shown for mounting upon blackjack tables. A special round of play having modified rules can be used as part of the jackpot award.

37 Claims, 17 Drawing Sheets

U.S. PATENT DOCUMENTS 5,022,653 A 6/1991 Suttle et al. ..... 273/85
5,078,405 A * 1/1992 Jones et al. ..... 273/292
5,098,107 A 3/1992 Boylan et al. ..... 273/292
5,112,060 A * 5/1992 Jones ..... 273/309
5,141,234 A * 8/1992 Boylan et al. ..... 463/12
5,174,579 A * 12/1992 Griffiths ..... 273/292
5,248,142 A * 9/1993 Breeding ..... 273/138.1
5,275,416 A * 1/1994 Schorr et al. ..... 273/292
5,277,424 A * 1/1994 Wilms ..... 463/12
5,288,081 A * 2/1994 Breeding ..... 273/292
5,364,104 A * 11/1994 Jones et al. ..... 273/292
5,364,105 A * 11/1994 Jones ..... 273/292
5,377,973 A * 1/1995 Jones et al. ..... 463/12
5,377,994 A * 1/1995 Jones ..... 273/309
5,382,025 A * 1/1995 Sklansky et al. ..... 273/292
5,393,067 A * 2/1995 Paulsen et al. ..... 273/292
5,407,208 A * 4/1995 Keller et al. ..... 273/274
5,417,430 A * 5/1995 Breeding ..... 273/292
5,437,462 A * 8/1995 Breeding ..... 273/292
5,472,194 A * 12/1995 Breeding et al. ..... 463/27
5,487,547 A * 1/1996 Hobert ..... 273/274
5,538,252 A * 7/1996 Green ..... 273/306
5,544,892 A * 8/1996 Breeding ..... 273/292
5,564,700 A * 10/1996 Celona ..... 463/27
5,570,885 A * 11/1996 Ornstein ..... 463/27
5,586,766 A * 12/1996 Forte et al. ..... 273/309
5,630,586 A 5/1997 Lowden ..... 273/138.2
5,636,843 A 6/1997 Roberts ..... 273/292
5,655,961 A 8/1997 Acres et al. ..... 463/27
5,702,304 A 12/1997 Acres et al. ..... 463/29
5,741,183 A 4/1998 Acres et al. ..... 463/42
5,752,882 A 5/1998 Acres et al. ..... 463/42
5,820,459 A 10/1998 Acres et al. ..... 463/25
5,836,817 A 11/1998 Acres et al. ..... 463/26
5,848,932 A 12/1998 Adams ..... 463/20
5,876,284 A 3/1999 Acres et al. ..... 463/25
5,934,998 A 8/1999 Forte et al. ..... 463/12
6,012,982 A 1/2000 Piechowiak et al. ..... 463/16
6,165,069 A 12/2000 Sines et al. ..... 463/12

* cited by examiner

GAMBLING GAME SYSTEM AND METHODS

Matter enclosed in heavy brackets [ ] appears in the original patent but forms no part of this reissue specification; matter printed in italics indicates the additions made by reissue.

This is a national stage application filed under 35 U.S.C. §371 of PCT application Ser. No. PCT/US95/12908, filed Oct. 13, 1995, which is a continuation-in-part of U.S. patent application Ser. No. 08/439,687, filed May 12, 1995 (now U.S. Pat. No. 5,586,766), which in turn was a continuation-in-part of U.S. patent application Ser. No. 08/242,229, filed May 13, 1994 (now abandoned).

DESCRIPTION

1. Technical Field

This invention relates to game systems and methods for playing the casino card game alternatively called blackjack, casino twenty-one, or simply twenty-one.

2. Background Art

The card game twenty-one or blackjack is a very popular card game. It is particularly popular as a casino card game involving betting. In casinos the house holds the dealer hand. In cardrooms, the house often by law is prohibited from holding the dealer hand, and one of the other players is dealer. The basic object of the game is to obtain a combined card count which beats the count of the dealer without going over twenty-one. The game is played with a common card deck or multiple decks having fifty two cards in four suits. Each suit has an ace, numerically indexed cards from two to ten, and the face cards. The face cards are jacks, queens and kings. Multiple decks can be combined together.

In the play of blackjack the dealer initially deals two cards to each player and the dealer. The cards are dealt one at a time around the table. The initial two cards to the players are either dealt both facedown or both faceup, depending upon the rules of the particular casino or cardroom involved.

The dealer receives one card faceup and the other initial card facedown. The faceup card is also called the "upcard". The face-down card is also called the "hole card". An initial wager is placed before dealing the first two cards. After the first two cards are dealt to all players, each player is offered a variety of options including: standing, hitting, splitting and doubling down. The player directs the dealer to deal zero, one or more additional cards to that particular player. Limits of betting, rules, and play vary between gaming establishments. If the player's total hand count exceeds twenty-one, then the player loses and this is often called a "bust". If the player stands with cards which count a total of twenty-one or less, then he is still in and the next player makes similar decisions about betting and additional cards. The dealer plays last and is instructed by the house to hold when a certain count is achieved, typically 17 or higher.

The best possible hand occurs when a player or dealer has a ten-count card and an ace after receiving the first two cards. This hand is referred to alternatively as a "blackjack" or "natural". A natural hand is a winning hand unless the opposing dealer or player also has a natural, in which case the play is called a push and neither the player or dealer involved lose their bet or collect from the other. A player who is dealt a natural hand is typically entitled to a bonus, such as equal to one and a half times the player's bet. All players lose if the dealer is initially dealt a natural hand, unless a player also has a natural. This is true except in the case when the player has taken what is called "insurance" (an amount usually equal to half the player's original bet).

A hand exceeding twenty-one is referred to as a "bust" or "bust hand" for both players and dealers. Players who are still in play win the hand when a dealer goes bust. The dealer wins when a player busts.

Blackjack has become one of the most popular casino card games. However, in many casinos it does not have the same popularity as gambling attraction which offer large jackpots, for example slot machines. In blackjack, winnings for each hand are limited to the amount wagered or a small multiple of the players' bets. This is in contrast to slot machines which can often be played for a chance of winning very large jackpots.

Some casinos have implemented jackpots in the game of blackjack. For instance, one blackjack variation awards a jackpot to players receiving four like value cards in the same hand. Another variation offers a jackpot for players receiving, in a single hand, seven cards which total twenty-one. These approaches have not been commercially significant. The lack of response has apparently been due to the absence of any logical relationship between the game of blackjack as it is normally played and the events which trigger such a jackpot. The lack of response may also be due to the infrequency of such jackpot events which is needed by the casino to make it possible to offer the jackpot.

Jackpots for blackjack have also been impeded by the difficulty in finding a jackpot event which is of sufficient interest to players and of a sufficiently low probability that the casino can afford to pay a jackpot on that event.

A related problem is that prior art card games offering jackpots are limited in their flexibility to offer different types of jackpots. In order to attract players, it is desirable to display large jackpot dollar amounts. However, these large jackpots are by necessity relatively infrequent events. Thus if a card game picks four seven cards as a jackpot hand, they have used an infrequent event which does not hold player attention. Thus there is a need for a card game system which can offer both large infrequent jackpots and smaller more frequent jackpots which will better hold the player's desire to continue playing the game.

The inventive game system and methods described below are revolutionary in providing a blackjack or other card game which allows both large infrequent jackpots and smaller more frequent jackpots to be offered. It further allows a casino to offer liberalized blackjack rules. This is accomplished without sacrificing the desirable aspects of playing blackjack which have made the game so popular.

BRIEF DESCRIPTION OF THE DRAWINGS

FIG. 14 is a top plan view of a still further alternative embodiment game system module according to this invention mounted upon a blackjack table.

FIG. 15 is a top plan view similar to FIG. 14 also showing cards, betting chips, and colored tabletop markings which aid in player interpretation of the game system module in combination with the table covering design.

FIG. 17 is a side elevational view of the game system module shown in FIG. 16. The opposite side view is a mirror image of this view.

FIG. 18 is a rear elevational view of the game system module shown in FIG. 16.

FIG. 19 is a front elevational view of the game system module shown in FIG. 17.

BEST MODES FOR CARRYING OUT THE INVENTION AND DISCLOSURE OF INVENTION

Figure 1:
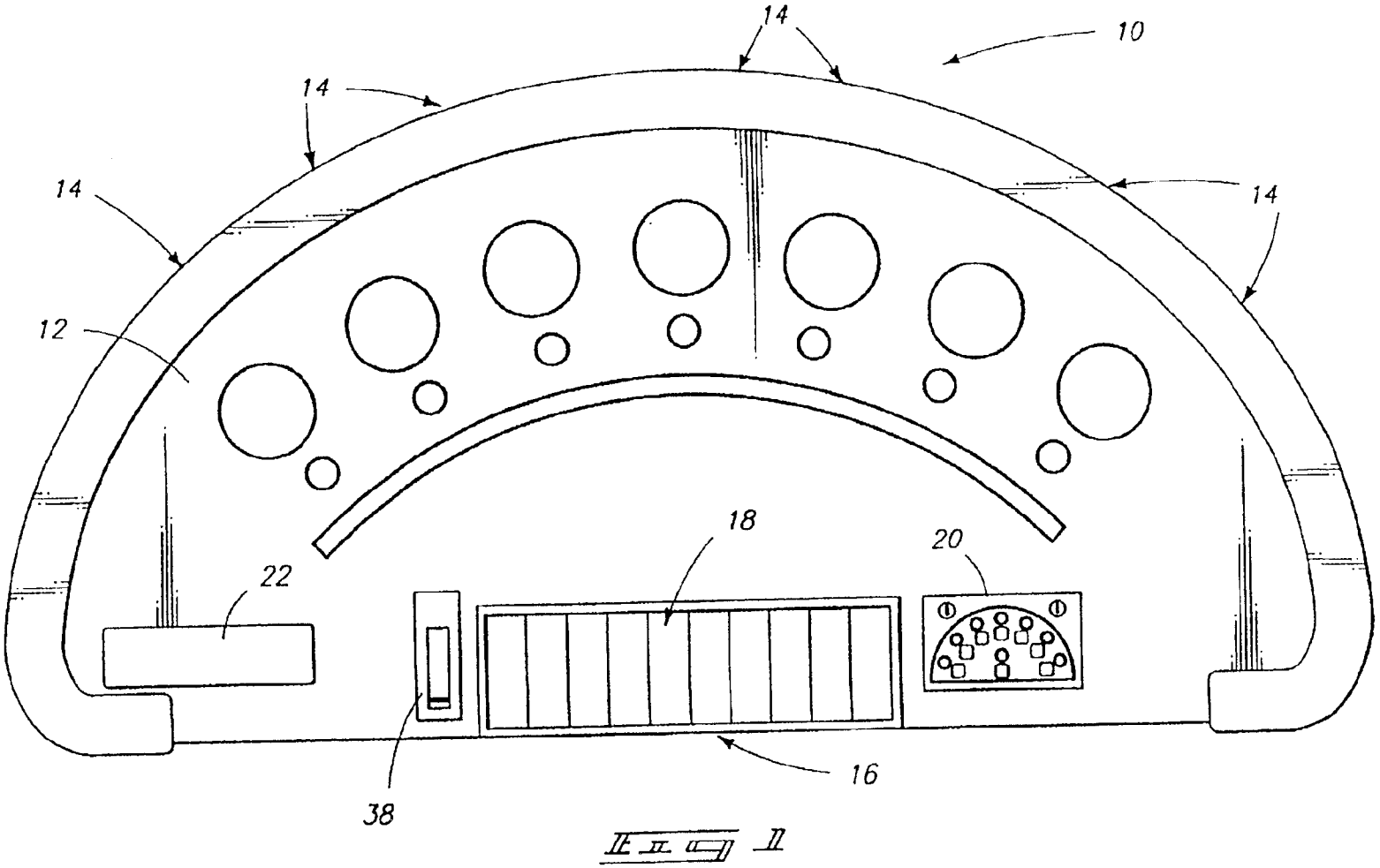
FIG. 1 is a top view of a game system in accordance with a preferred embodiment of the invention.

The invention described herein define novel card games and methods. The card game is most preferably blackjack. The novel games can pay attractive jackpots based upon sequential occurrences of jackpot triggering events. These jackpot triggering or jackpot tally events are counted to provide player and dealer count values which must achieve a threshold value to result in a jackpot award. The jackpot tally events are most preferably required to occur in a sequence of consecutive hands. The typical consecutive jackpot tally events are dealer busts and consecutive non-dealer player natural hands (blackjack hands). The natural hands of the player are winning hands. The busts of the dealer are losing hands.

The invention can further include having several blackjack tables which share a common jackpot, thereby increasing the size of available jackpots.

As in conventional blackjack, a game played in accordance with the invention involves a dealer and at least one non-dealer player. A plurality of non-dealer players are typically involved but only one non-dealer player is necessary. One preferred embodiment of the invention described herein accommodates up to seven players, in addition to the dealer.

The game includes dealing a series of card hands to each player and to the dealer in accordance with common blackjack playing procedures. The hands are dealt by initially dealing two rounds of single cards to the dealer and each non-dealer player, thus giving each player two cards.

The game includes counting and maintaining a player count value for the players. The player count values indicate the current number of player jackpot tally events which the player has to his credit. The jackpot tally events or jackpot hands are preferably credited in serially consecutive runs, such as serially consecutive occurrences of a natural or blackjack hand. Other events can alternatively count toward a jackpot count sufficient to produce a jackpot award. Two ten cards might be an alternative jackpot tally event hand, which when obtained consecutively lead to a jackpot award. Alternatively, the non-dealer players may be given a jackpot tally count when the dealer has a natural hand. This could be preceded or followed by one or more player natural or naturals leading to a jackpot award. A further possible player jackpot tally event might be attributable to a player's jackpot count when the player obtains a total card count of twenty or twenty-one, even though more than the initial two cards were required to produce the twenty-one hand count.

The game also includes counting or otherwise maintaining a dealer count value which indicates the number of consecutive bust or other dealer event jackpot hands dealt to the dealer. These dealer jackpot tally events can include a dealer bust hand or a dealer natural hand. Other dealer jackpot tally events are also possible. Alternatively, dealer events such as busts can be credited to the counts of players or used to offer increased jackpots for non-dealer players during the next consecutive hand or other subsequent play.

The counting steps are preferably accomplished by providing at least one player counter and a dealer counter. The counters are preferably electronic counters capable of registering multiple jackpot count values for multiple players and the dealer.

After dealing the initial two cards to himself and each player, the dealer identifies all players who have been dealt natural or other jackpot hands in the current hand being played. The dealer then increments the player count values of all players identified as having been dealt natural or other jackpot-count hands. In another embodiment the dealer increments after all hands are fully played out. The hand is played out with the remaining players, and the dealer increments the dealer count value if the dealer is dealt a bust hand or other dealer tally jackpot hands.

The game also preferably includes zeroing the player count values of all players not identified as having been dealt natural or other player jackpot count hands in the current hand. Additionally the game includes zeroing the dealer count value if the dealer has not been dealt a bust or other dealer jackpot count hand in the current hand. An end-of-hand device is advantageously operated by the dealer at the end of each hand to automatically initiate the zeroing steps.

The preferred methods according to this invention further include awarding a bonus or jackpot, referred to as a player bonus, to any player whose player count value meets or exceeds a predefined player count value threshold. For instance, a first natural bonus of perhaps $50 is awarded to any player whose player count value meets or exceeds a first predefined player count value threshold of three. For example, this count indicates that the player has been dealt at least three consecutive natural card hands. A second natural bonus of perhaps $500 is awarded to any player whose player count value meets or exceeds a second predefined player count value threshold of four. This indicates that the player has been dealt four consecutive natural card hands. Progressively increasing player bonuses are awarded for correspondingly increasing player count values.

In a similar manner, the preferred methods of the invention include awarding, a bonus or jackpot, referred to as a "bust" or dealer jackpot bonus, to all the players at a particular table when the dealer jackpot tally event count exceeds a predefined dealer jackpot count value threshold. For instance, a first bust bonus of $50 is awarded to all players when the dealer jackpot count value meets or exceeds a first predefined dealer count value of five. This indicates that the dealer has been dealt five consecutive bust card hands. A second bust bonus of $100 is awarded to all active players when the dealer jackpot count value meets or exceeds a second predefined dealer count value of six. This indicates that the dealer has been dealt six consecutive bust card hands. Progressively increasing bust bonuses are awarded for correspondingly increasing dealer count values.

Because of the statistically low probability of any player being dealt consecutive natural hands, or of the dealer being dealt consecutive bust hands, relatively large bonuses or jackpots can be provided. It is believed that jackpots of up to a million dollars could be offered in conjunction with a game played in accordance with the invention. Furthermore, it is believed that the presence of large jackpots, in addition to the normal winnings of blackjack, will be attractive enough to allow casino operators to collect a small per hand surcharge or "ante" for each hand of blackjack played in accordance with the methods of this invention. Such an ante could be used to fund the jackpots and can also allow more liberalized blackjack rules during each hand. Alternatively, the predetermined bonus count amounts can be set to assure a suitable improved margin for the casino.

Figure 2:
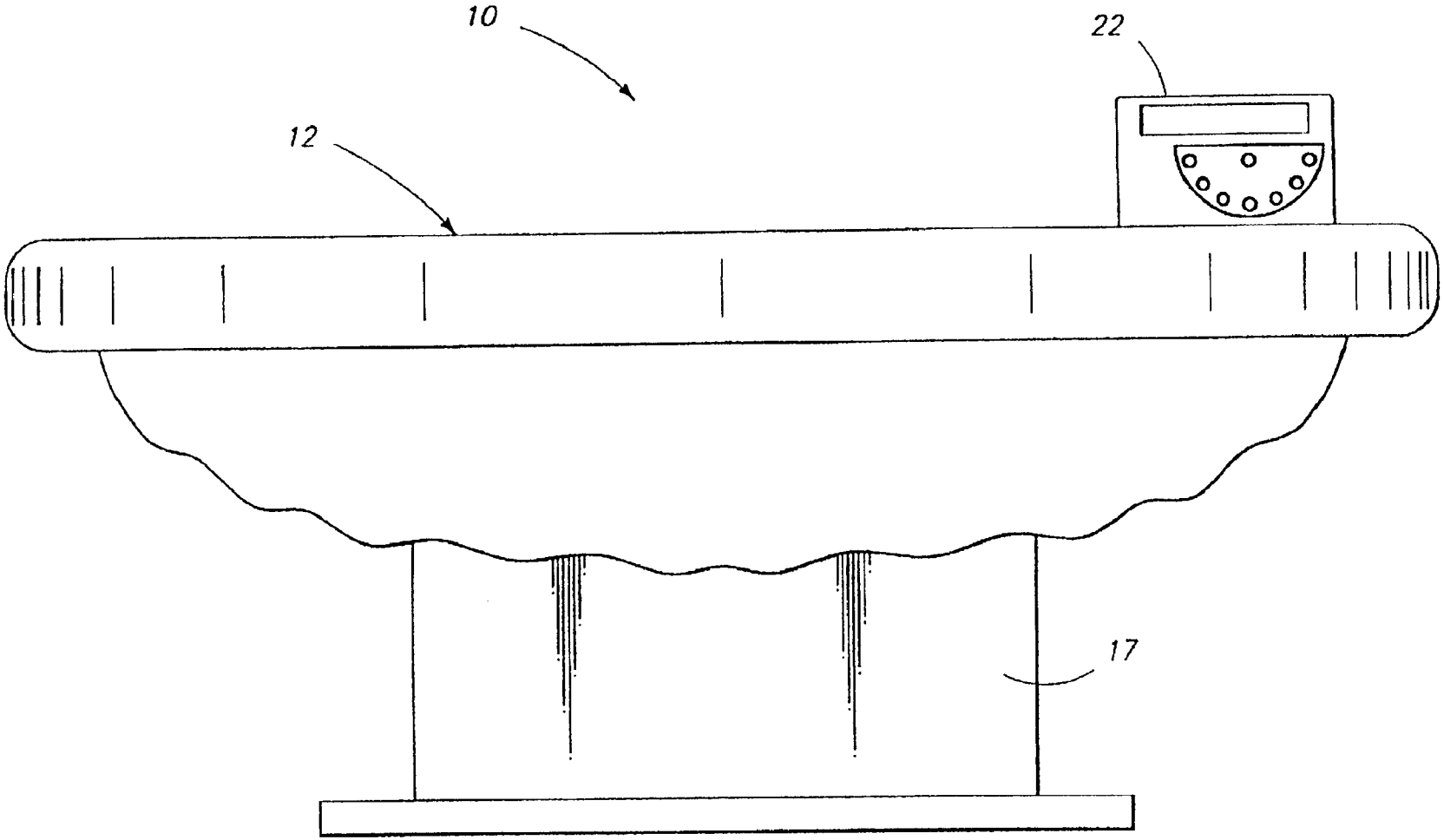
FIG. 2 is a front view of the game system shown in FIG. 1.

FIGS. 1 and 2 show an improved blackjack table in accordance with a preferred embodiment of the invention, generally designated by the reference numeral 10. Table 10 includes a tabletop 12 having a conventional felt playing surface. Table top playing surface 12 can be provided with conventional markings corresponding to seven player positions 14 arranged in an arc about a dealer position 16. Table 10 also includes a chip tray 18 for storing gaming chips. The table is supported by a pedestal 17.

Table 10 includes two status displays which are connected to display player jackpot count values and the dealer jackpot count values. In a preferred version, the player count values correspond to the number of consecutive natural hands dealt to the players. The dealer count values corresponding to the number of consecutive bust hands dealt to the dealer. One of the displays is positioned for viewing by the dealer, preferably in the form of a dealer console 20. The other display is advantageously positioned for viewing by the players, such as in the form of player console 22. Both of the status displays are advantageously mounted to playing surface 12. Dealer and player consoles 20 and 22 are provided to monitor and display the current status of the game. Specifically, the consoles display the current number of consecutive natural hands which have been dealt to each player and the current number of consecutive bust hands which have been dealt to the dealer. Dealer console 20 additionally provides input functions to allow the dealer or operator to signal the occurrence of natural or bust hands.

Figure 3:
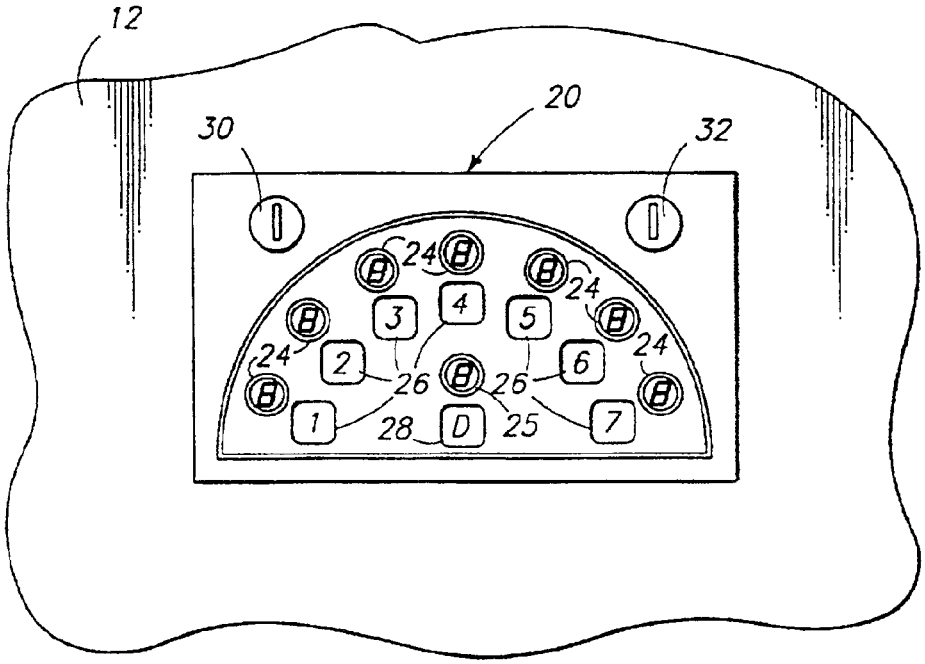
FIG. 3 is an enlarged view of a dealer console in accordance with a preferred embodiment of the invention.

FIG. 3 shows dealer console 20 in detail. It is mounted flush with playing surface 12, facing upwardly, preferably at a position adjacent to the dealer. It includes a diagrammatic representation of a blackjack table, including a plurality of numeric indicators corresponding to the dealer and maximum number of players. Seven indicators 24 are arranged in an arc to correspond to the seven player positions at the blackjack table. An eighth indicator 25, positioned at or near the centerpoint of the arc, corresponds to the dealer's position. The indicators are positioned on the face of console 20 in a layout simulating the arrangement of the actual dealer and players relative to table 10. Each numeric indicator is advantageously a seven-segment LED (light emitting diode), capable of displaying a single digit in the range of zero through nine.

Dealer console 20 further comprises a player key 26 for each player. Each player key 26 is manually operable to indicate or signal that the player has been dealt a natural or other jackpot hand. More specifically, each player key 26 is a membrane-type switch which is depressible by the dealer to increment an individual player's count value when said individual player has been dealt a natural hand. Each player key is positioned adjacent a numeric indicator. A numeric indicator 24 and a player key 26 are thus positioned to correspond to each player. Dealer console 20 also includes a dealer key 28 which is depressible or otherwise manually operable to indicate or signal that the dealer has been dealt a bust hand, and to increment the dealer's count value when the dealer has been dealt a bust hand. Dealer key 28 is positioned adjacent numeric indicator 25. Appropriate legends are printed on the keys. For instance, the player keys are labelled "1" through "7". The dealer key is labelled "D". The player keys and, dealer key 28 are preferably membrane-type switches. Capacitive or other types of keys or switches can also be used to allow the dealer to signal the occurrence of player jackpot and dealer jackpot hands.

Finally, dealer console 20 includes a pair of locking keyswitches 30 and 32. The functions of these keyswitches will be explained in more detail below. In general, keyswitches 30 and 32 are operable by a floor manager and by a pit boss, respectively, to reset the game control circuits or to implement other system control functions.

Figure 4:
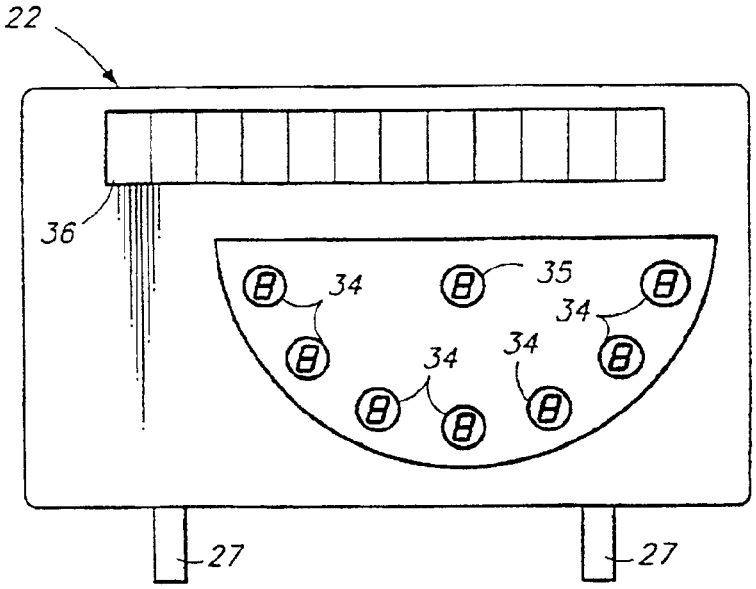
FIG. 4 is an enlarged view of a player console in accordance with a preferred embodiment of the invention.

FIG. 4 shows player console 22. Console 22 is advantageously adapted for mounting to table 10 by a pair of mounting struts 27. It is positioned to face away from the dealer and, toward the players. Player console 22 includes a numeric indicator 34 for each player, arranged in an arc similarly to indicators 24 of dealer console 20. Player console 22 also includes a numeric indicator 35 for the dealer, positioned centrally within of the arc formed by numeric indicators 34. Console 22 does not include player keys or a dealer key. The numeric indicators of player console 22 are preferably similar or identical to the indicators used in dealer console 20. However, the dealer and player displays are oriented oppositely with regard the arc direction to reflect the different perspectives of the table as viewed by players and the dealer. Because the indicators are arranged like the players about table 10, players can immediately associate each of the indicators with a specific player or dealer position.

Player console 22 also preferably includes a programmable signboard or textural display 36. Programmable signboard 36 is of a type which can be controlled through a digital communications port. It is preferably a matrix-type display, having individual pixels which are illuminated or activated to present selected messages across the top of player console 22. Signboard 36 is capable of forming scrolling or flashing messages for added visual impact and to serve as an attraction to draw players to the game system.

While inexpensive forms of dealer and player consoles are shown and described, variations are of course possible. For instance, it may be desirable in some situations to utilize a single matrix or pixel-type display, such as commonly used in conjunction with personal computers, in place of the discrete numeric indicators of each status display. Such a display would be controlled by software to display individual count values in the desired arrangement. A display such as this might also incorporate "touch" input features, so that the dealer could signal natural or bust hands by simply touching a designated area of the display rather than discrete keys. A rectangular matrix display could also be programmed to incorporate the textual display or signboard discussed above. Alternatively, some components of the consoles, such as the numeric indicators, might be physically positioned around the table, rather than grouped as described above.

In addition to the status displays, table 10 also advantageously includes an end-of-hand device 38 (FIG. 1) which is positioned for manual operation by the dealer at the end of each hand to signal the end of the hand. End-of-hand device 38 is preferably a conventional poker slide into which the ante chips from the players deposited before each hand. At the end of the hand, the dealer operates the poker slide to accept the deposited chips. The poker slide includes a sensor or switch (not shown) which is connected to the control unit 40 in order to zero the player count values of players who were not dealt natural hands in the previous hand. It also serves to trigger zeroing of the dealer count value if the dealer was not dealt a bust hand in the previous hand.

Figure 5:
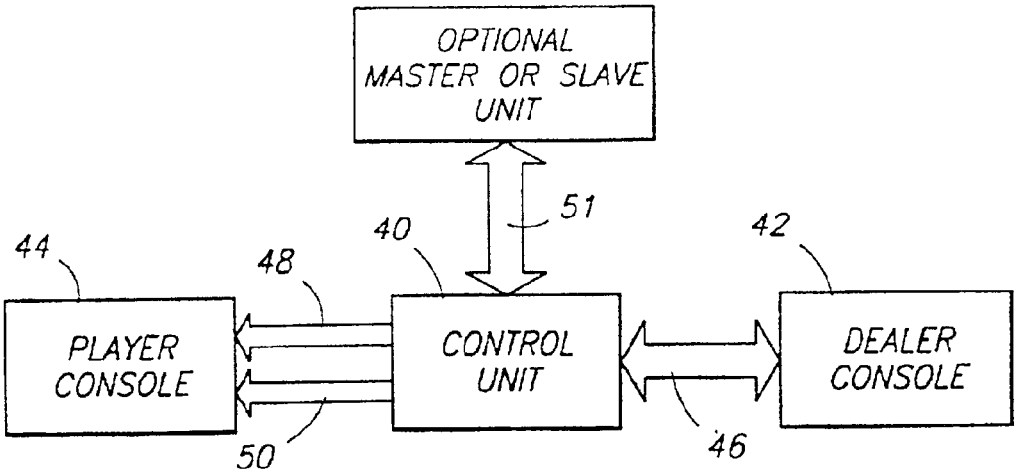
FIG. 5 is a simplified block diagram of a preferred control system for the game system of FIG. 1.

FIG. 5 shows a simplified block diagram of a preferred control system for the game system described above. It comprises three units: a programmable control unit or controller 40, a dealer console circuit 42, and a player console circuit 44. In actual practice, control unit 40 is physically incorporated with dealer console circuit 42. For purposes of explanation, however, control unit 40 and dealer console circuit 42 are described below as two separate circuits. Either configuration is acceptable.

Figure 6:
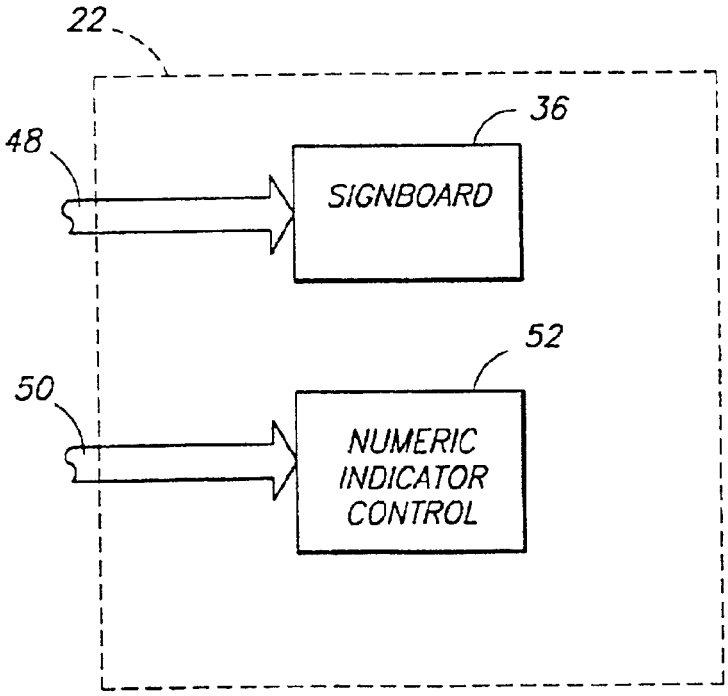
FIG. 6 is a simplified block diagram of a player console control circuit in accordance with a preferred embodiment of the invention.

Control unit 40 is connected to dealer console circuit 42 by a number of individual parallel lines, collectively referenced by the numeral 46. Control unit 40 communicates with player console circuit 44 through first and second serial signals 48 and 50. As shown in FIG. 6, first serial signal 48 is connected from control unit 40 to programmable signboard 36 of player console 22. Second serial signal 50 is connected from control unit 40 to a numeric indicator control circuit 52. Programmable signboard 36 is a conventional commercially available product which can be commanded by control unit 40 to display various textural messages in a variety of formats. Numeric indicator control circuit 52 is a custom circuit, described below, which allows control unit 40 to command player console 22 to display the player count values and the dealer count value. A third, optionally serial signal 51 can be used to communicate with a master or slave blackjack table as discussed below.

Control unit 40 is preferably a microprocessor-based logic circuit, programmed to monitor the player and dealer keys and to control the indicators and displays of game table 10. It is connected to command the numeric indicators of dealer console 20 and player console 22, as well as to command programmable signboard 36 through first serial signal. It is also connected to be signalled by the player keys, the dealer key, and the end-of-hand device. More specifically, control unit 40 is programmed to provide and maintain a plurality of counters or counter registers. A player counter is maintained for each player and a dealer counter is maintained for the dealer. Each player counter counts and registers the player count value for a particular player. The dealer counter counts and registers the dealer count value.

As discussed above, the player count values indicate the number of consecutive natural hands dealt to individual players. The dealer count value indicates the number of consecutive bust hands dealt to the dealer. The counters are preferably maintained in one or more microprocessor registers or in read/write memory associated with a microprocessor. Dealer console 20 and player console 22 are connected to receive information from the player and dealer counters and to display such information to the players and the dealer.

Control unit 40 might alternatively be designed with circuit elements other than microprocessor-related components. For instance, control unit 40 could advantageously be implemented with discrete logic gates or with programmable gate arrays. However, a microprocessor-based system allows a degree of flexibility which is desirable as compared with other types of circuits.

Regardless of the specific means of implementation, control unit 40 forms means for keeping a count and selectively incrementing individual players' player count values in response to operating the player keys corresponding to said individual players. Control unit 40 also forms means for incrementing the dealer count value in response to operating the dealer key. Additionally, control unit 40 forms means for zeroing, at the end of each hand, the count values of players which were not dealt a natural hand in the previous hand. It also serves as a means for zeroing, at the end of each hand, the dealer count value if the dealer was not dealt a bust hand in the previous hand. Said zeroing functions are advantageously performed in response to operating end-of-hand device 38 at the end of each hand.

Furthermore, control unit 40 is programmed and forms means for displaying the dealer count value and the player count values of all the players. In the preferred embodiment of the invention, control unit 40 is further programmed to command programmable signboard 36 of dealer console 22 to indicate the award of the natural and bust bonuses discussed above for consecutive natural or bust hands. Programmable signboard 36 can also be used to display other messages, such as current jackpot amounts, attractions messages, or other useful information.

Figure 7:
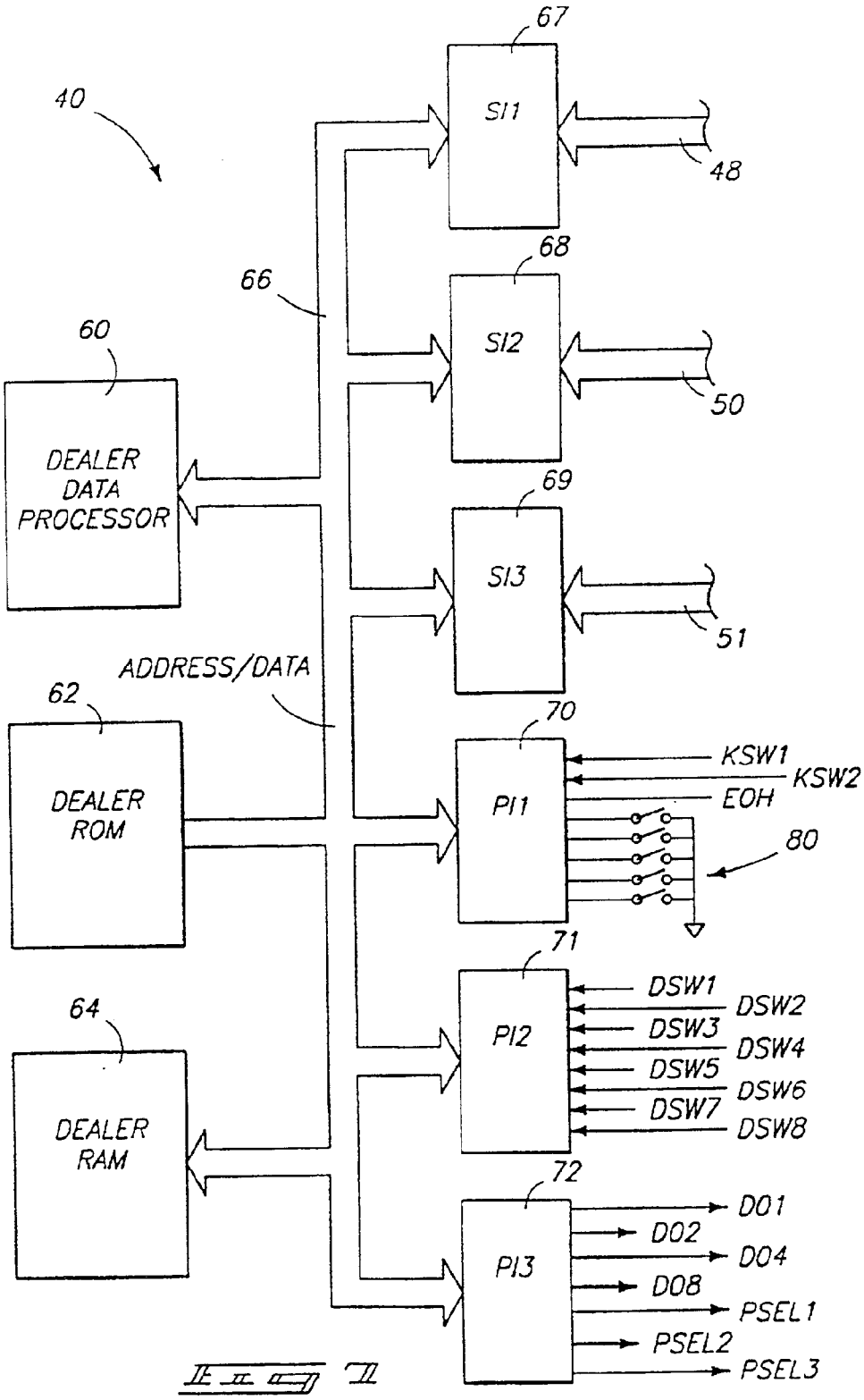
FIG. 7 is a block diagram of a preferred control unit in accordance with the invention.

FIG. 7 shows control unit 40 in more detail. It comprises a programmable data processor or microprocessor 60, associated with program memory 62 and data memory 64. Program memory 62 typically comprises a read-only memory or erasable read-only memory. Data memory 64 typically comprises read/write memory. Data memory 64 is preferably non-volatile memory such as battery-backed memory. The various components of control unit 40 communicate through a conventional address/data bus 66.

Control unit 40 includes three conventional serial port interface chips or integrated circuits, designated in FIG. 7 by the reference numerals 67, 68, and 69. These chips provide three serial ports, corresponding to serial signals 48, 50, and 51 of FIG. 5. First and second serial signals 48 and 50 are connected to player console 22. Third serial signal 51 is intended to be used for communications with a host computer or other blackjack tables as described below.

Control unit 40 also includes three parallel I/O chips, designated in FIG. 7 by the reference numerals 70, 71, and 72. The first two I/O chips 70 and 71 each accept eight inputs. The third I/O chip 72 has eight output lines.

Figure 8:
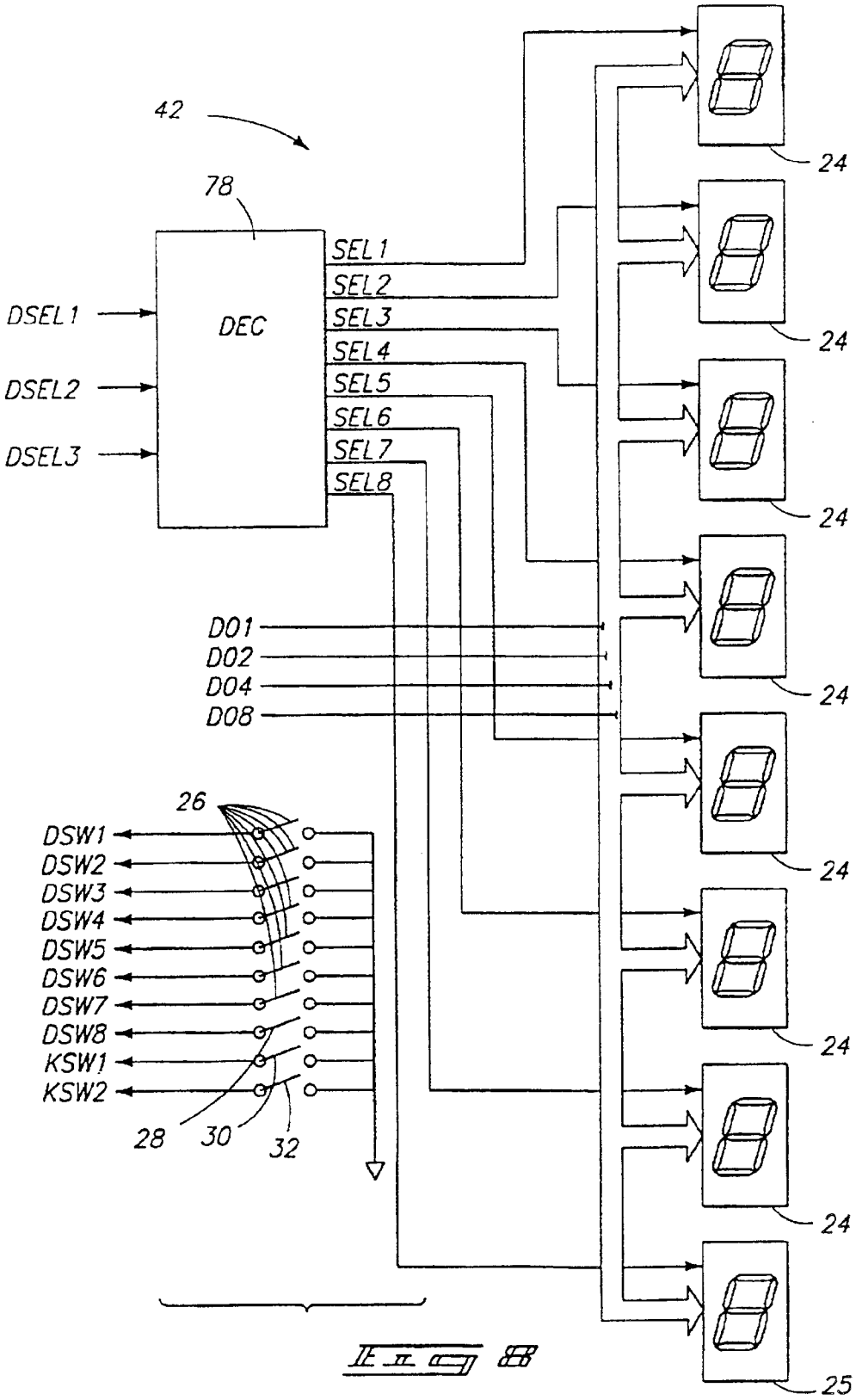
FIG. 8 is a block diagram of a preferred dealer console control circuit in accordance with the invention.

FIG. 8 shows dealer console circuit 42, which includes numeric indicators 24 and 25. Each numeric indicator comprises a conventional LED indicator in combination with a discrete control chip or integrated circuit. The numeric indicators are multiplexed to receive a common four bit binary command signal, comprising the individual signals D01, D02, D04, and D08. D01, D02, D04, and D08 are produced by I/O chip 72 (FIG. 7), in response to commands from microprocessor 60. Each indicator also accepts one of a set of eight chip select signals designated SEL1–SEL8. SEL1–SEL8 are generated by a three-to-eight decoder 78 which is driven by a set of dealer console select lines DSEL1–DSEL3. DSEL1–DSEL3 are produced by I/O chip 72 (FIG. 7), again in response to commands from microprocessor 60. Microprocessor 60 is programmed to command numeric indicators, through I/O chip 72, to display the player count values and the dealer count value.

FIG. 8 also shows player keys 26, dealer key 28, and keyswitches 30 and 32. Each of these switches has a first terminal connected to ground, and a second terminal connected to an input of I/O chip 70 or 71. The player and dealer keys are connected to I/O chip 71 through signal lines DSW1 through DSW8. Keyswitches 30 and 32 are connected to I/O chip 70 through signal lines KSW1 and KSW2. End-of-hand device 38 (shown only in FIG. 1) is connected to an input of I/O chip 70 through an input signal EOH (FIG. 7).

Keyswitches 30 and 32 are used to alter the operating mode of the system for providing control functions. For instance, one of the keyswitches is operable by a floor manager to allow the floor manager to adjust counter totals. When activated, this keyswitch allows individual counters to be selectively incremented by repeatedly depressing the appropriate player or dealer keys. The other of the keyswitches is operable by a casino pit boss to enable other control functions such as specifying jackpot amounts and display modes. The player and dealer switches are used to input the appropriate information.

In addition to the indicators and switches discussed above, control unit 40 includes five mode switches, labelled 80, connected to inputs of I/O chip 70. These switches are used to select operating characteristics of the gaming system. It is contemplated that mode switches 80 will be used primarily to specify to microprocessor 60 whether game table 10 should operate in a stand-alone, master mode or as a slave to another table or to a master computer. When acting as a slave, jackpot amounts would be controlled by a master table or computer, and table 10 would report game status to the master table or computer. This would allow a plurality of tables to share a common jackpot, and would allow monitoring of game status from a central location. Mode switches 80 are also used to specify the address of game table 10 when it is operating as a slave. Other functions might be associated with mode switches 80 in the future.

Figure 9:
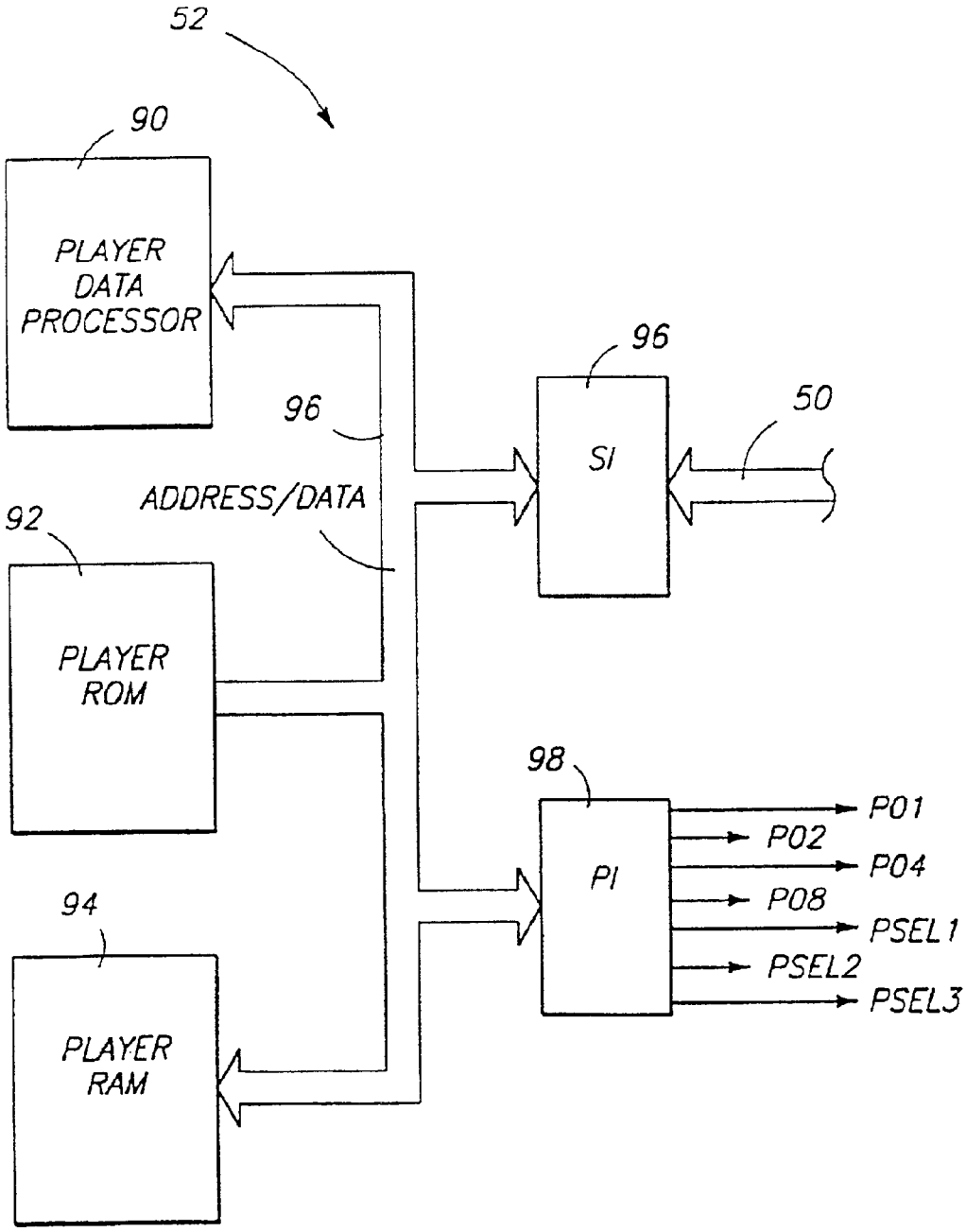
FIGS. 9 and 10 are block diagrams showing a preferred player console control circuit in accordance with the invention.
Figure 10:
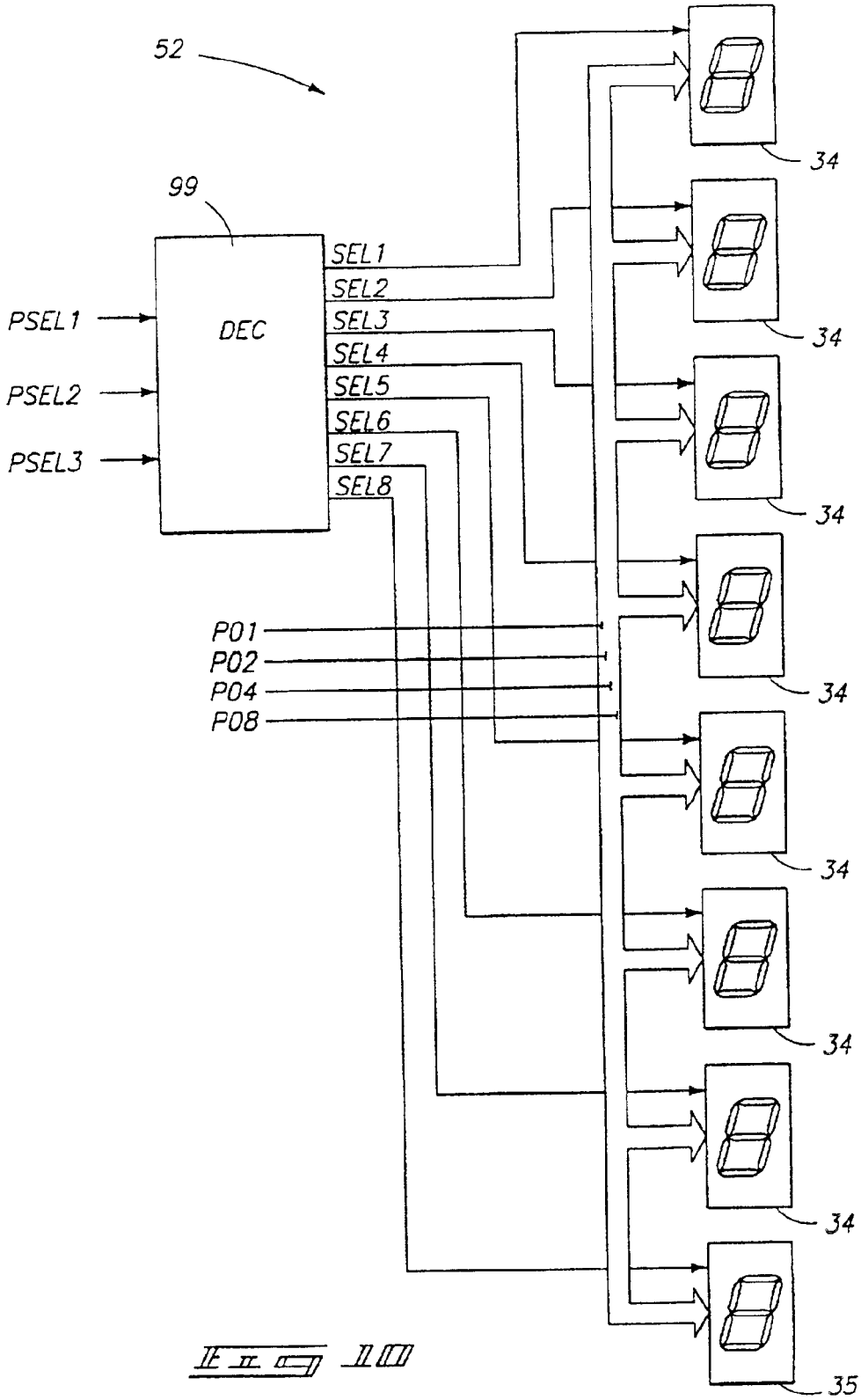

FIGS. 9 and 10 show numeric indicator control circuit 52. Numeric indicator control circuit 52 is nearly identical to the combination of control unit 40 and dealer console circuit 42, shown in FIGS. 7 and 8, except that it includes only a single serial interface chip and a single parallel I/O chip, and it does not include any switches. Thus, numeric indicator control circuit 52 comprises a programmable data processor or microprocessor 90, associated with read-only program memory 92 and read/write data memory 94. The components of numeric indicator control circuit 52 communicate through a conventional address/data bus 96. Numeric indicator control circuit 52 furthermore includes a conventional serial port interface chip or integrated circuit 96, and a parallel I/O chip 98, I/O chip 98 has eight output lines.

As shown in FIG. 10, numeric indicator control circuit 52 also includes numeric indicators 34 and 35. Each numeric indicator comprises a conventional LED indicator in combination with a discrete control chip or integrated circuit. The numeric indicators are multiplexed to receive a common four bit binary command signal, comprising the individual signals P01, P02, P04, and P08. P01, P02, P04, and P08 are produced by I/O chip 98 (FIG. 9), in response to commands from microprocessor 90. Each indicator also accepts one of a set of eight chip select signals designated SEL1 through SEL8. SEL1 through SEL8 are generated by a three-to-eight decoder 99 which is driven by a set of player select lines PSEL1 through PSEL3. PSEL1 through PSEL3 are produced by I/O chip 98 (FIG. 9), again in response to commands from microprocessor 90. Microprocessor 90 is programmed to command numeric indicators 34 and 35, through I/O chip 98, to display the player count values and the dealer count value in response to serial commands from control unit 40 through serial signal 50.

The game system described retains all the features of conventional casino blackjack. In addition, it provides variety jackpot features or different jackpot possibilities. The game system, as a result, is more exciting to play than conventional blackjack. When playing in accordance with the methods of the invention, players have the hope not only of winning individual hands, but of also winning jackpots based on consecutive hands or other sequential jackpot tally events. The increase in potential winnings is likely to make the game even more popular than conventional forms of blackjack. Furthermore, the added desirability or potential jackpot winnings should make it possible to collect hand surcharges or antes and to thus increase revenues of gaming establishments. Additionally, the procedures may allow more liberalized rules of play.

Figure 11:
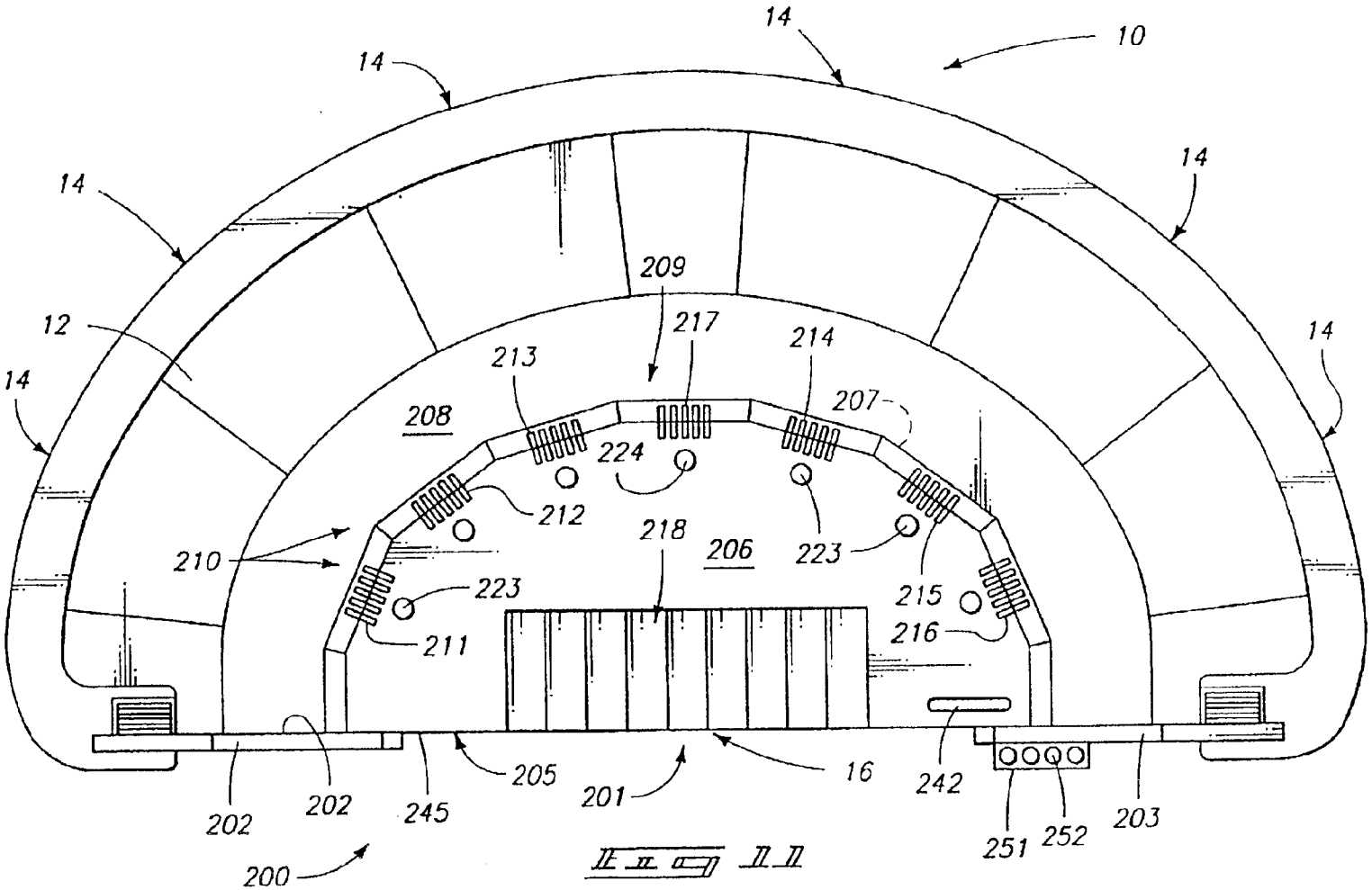
FIG. 11 is a top plan view of an alternative game system according to this invention.
Figure 11:
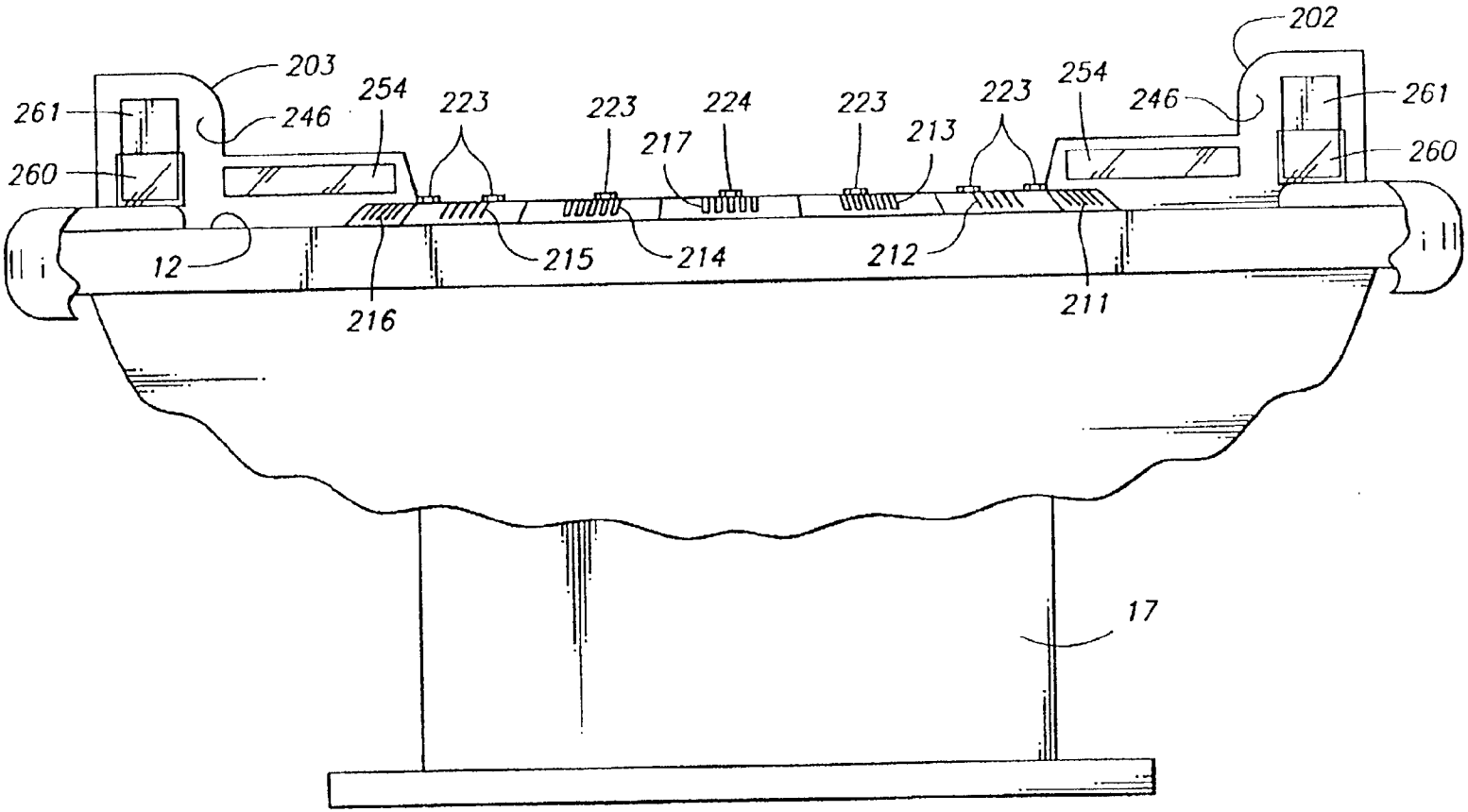
Figure 11:
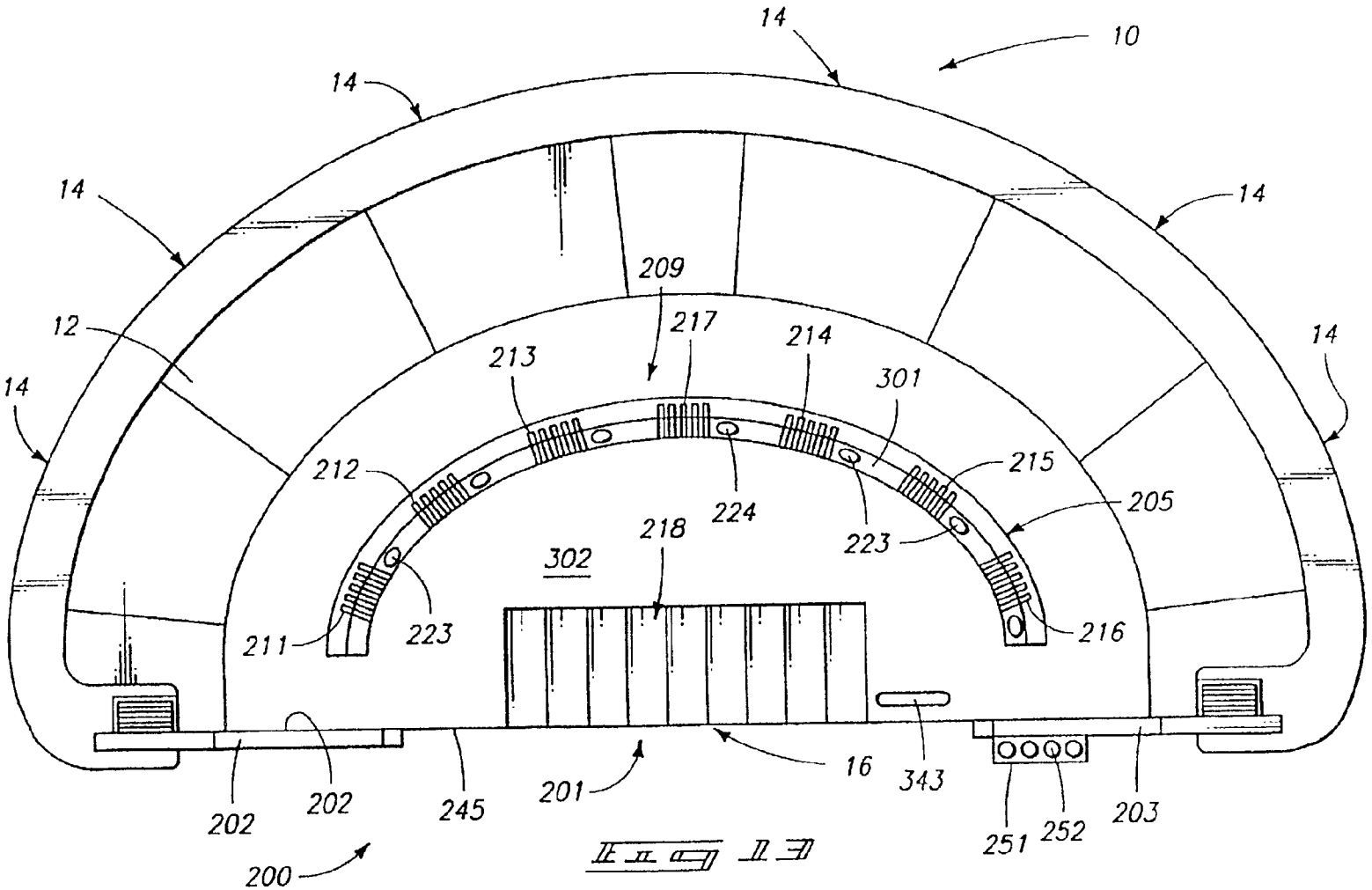
Figure 11:
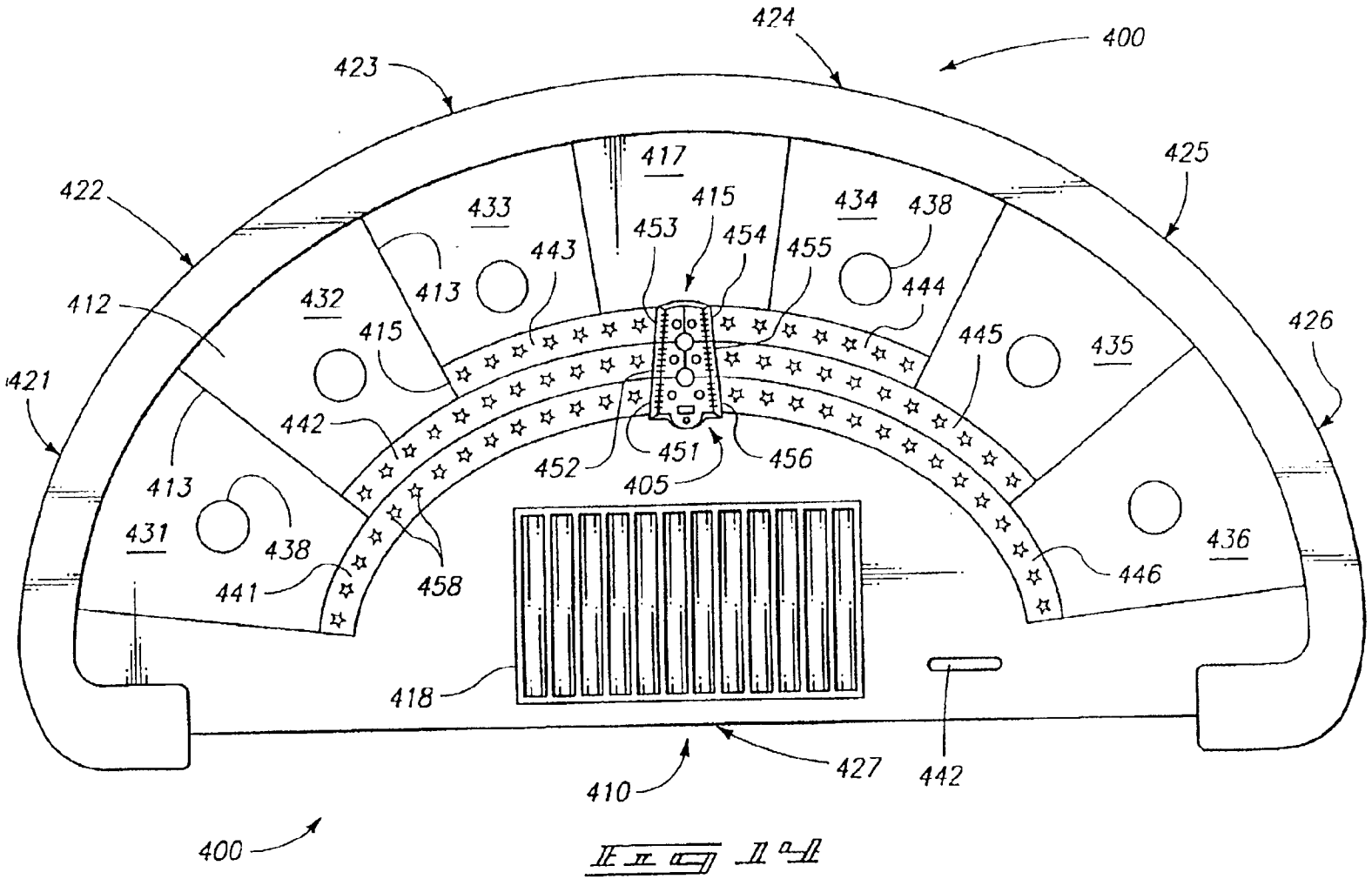
Figure 11:
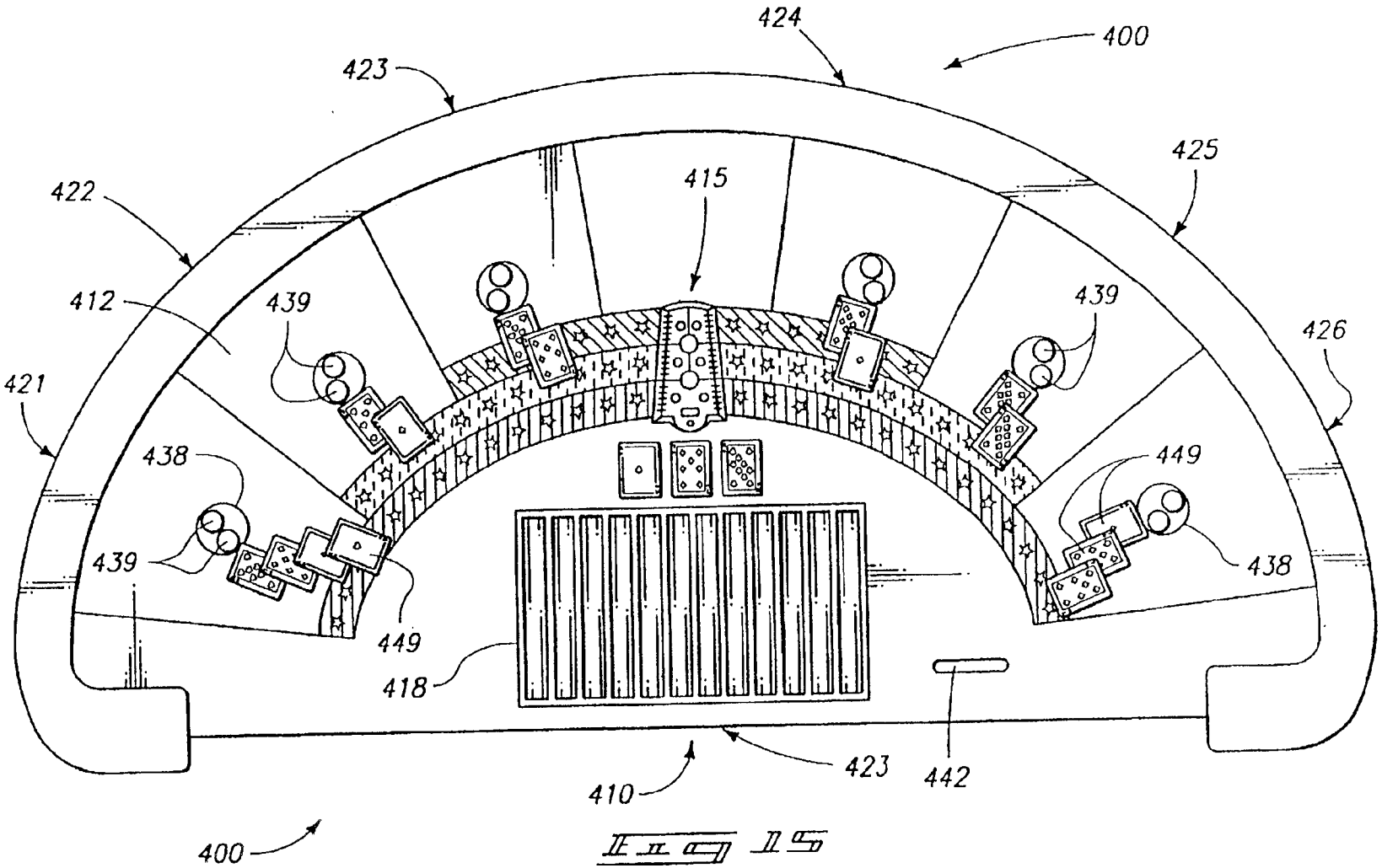
Figure 16:
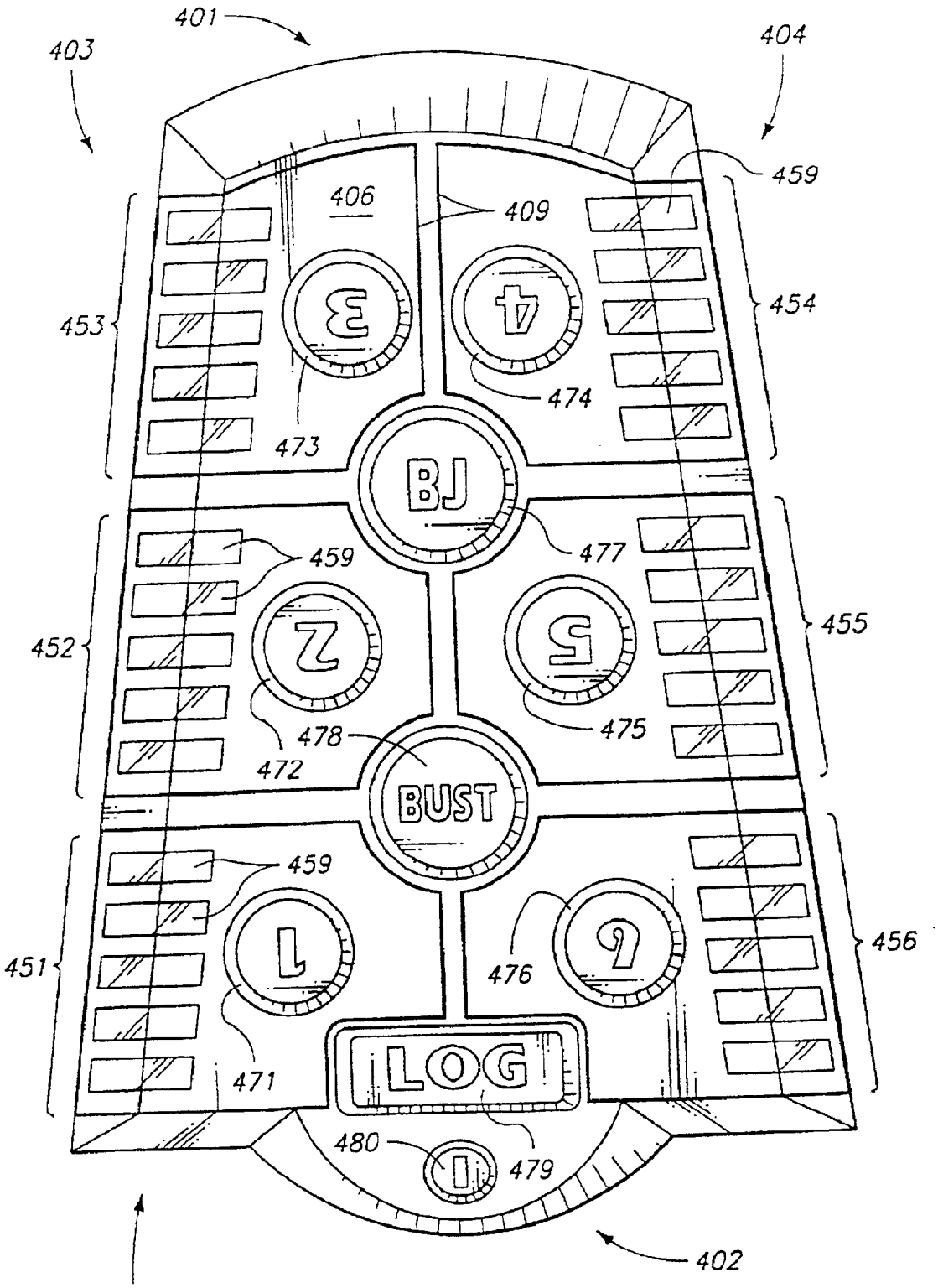
FIG. 16 is an enlarged top plan view of the game system module shown in FIGS. 14 and 15 in isolation from other parts of the game system.
Figures 11, 12, 13:
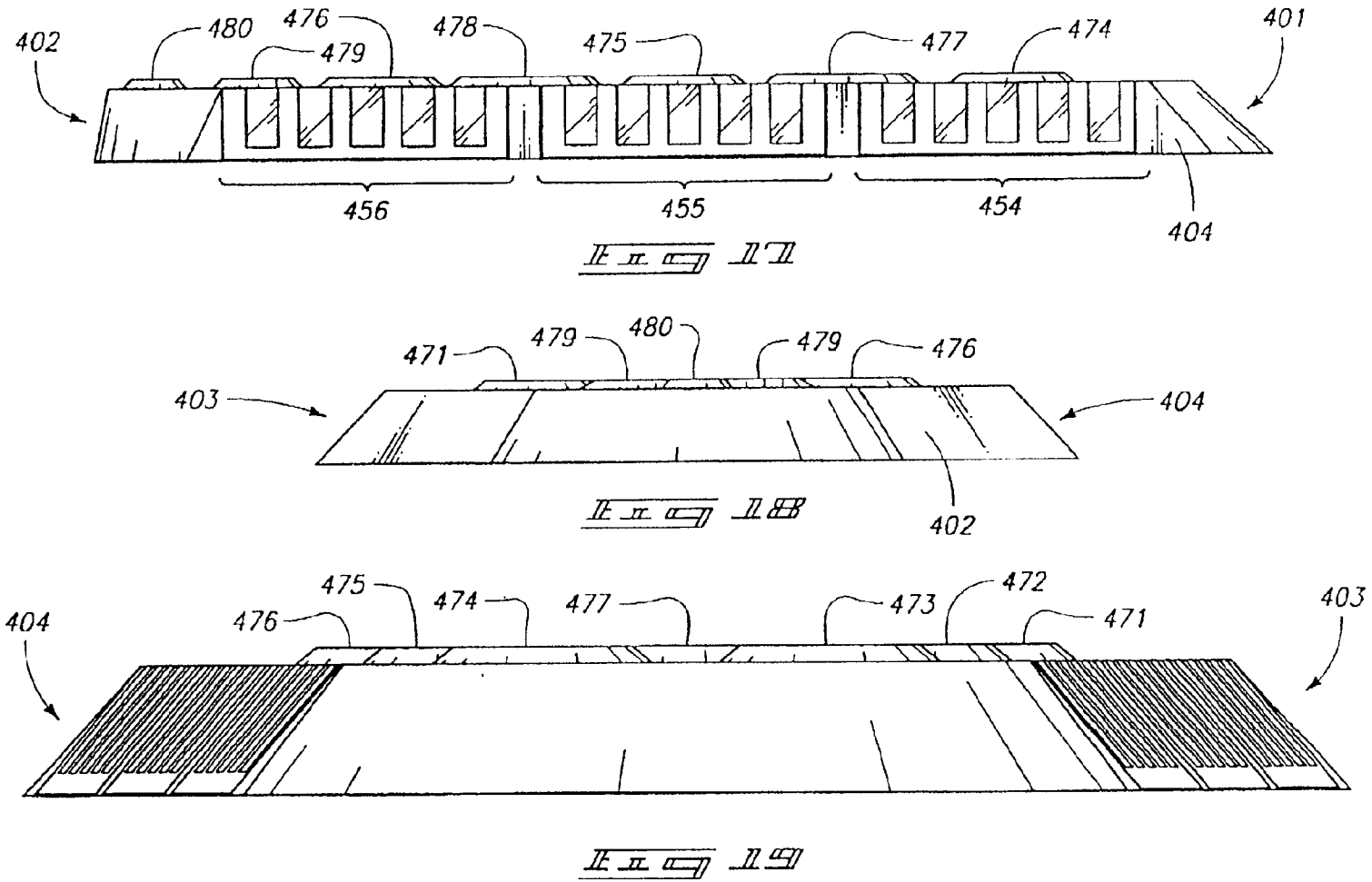
FIG. 12 is a front elevational view of a blackjack table fitted with the alternative game system shown in FIG. 11.
FIG. 13 is a top plan view of a further alternative embodiment game system of this invention mounted upon a blackjack table.

FIGS. 11 and 12 show an alternative gaming system 200 according to this invention. Gaming system 200 is an electronic retrofit tabletop game system constructed to be mounted upon a standard blackjack table 10. Table 10 is as described above in connection with the embodiment shown in FIG. 1, including six player positions 14 and playing surface 12. Gaming system 200 includes a first or central module 201 and two side modules 202 and 203. Central module 201 has a low profile and is positioned in a central location upon the blackjack table adjacent to the dealer's position 16. The port side module 202 is at the dealer's left and the starboard side module 203 is at the dealer's right. Central module 201 includes a chip tray 218 adjacent the dealer position which has a plurality of receiving troughs for holding gaming chips (not shown).

The central module 201 preferably includes a central module housing 205. Housing 205 has a top member with an upper surface 206. Housing 205 also has a lower or bottom member 207 which rests upon the upper playing surface 12 of gaming table 10. The top and bottom members are joined by a perimeter embankment or curb wall 209. The leading or front edge 208 of curb wall 209 rests upon the upper playing surface of gaming table 10. The curb is preferably constructed so as to provide a front wall which is sloped at a suitable angle, such as in the range of 30–60° from horizontal. This inclined or sloped construction provides improved utility for handling of cards by the dealer, reduced risk of injury to the dealer's hands and arms when working over the curb, and improved visibility for the displays mounted thereon. As shown in FIGS. 11 and 12, the top edge of the curb is preferably flush with the upper surface of the central module top member 206.

Housing 205 defines an interior cavity within which are mounted various electronic components and wiring associated with the control system 40 and displays, switches and other components which are described more specifically elsewhere herein. The housing of central module 205 is constructed so as to provide a mechanically integrated unit containing such internal components. Such a central module can be easily moved to a gaming table and placed in the position shown in FIG. 11.

A series of indicator displays 210 are arranged along curb 209. Displays 210 include six player displays 211–216. A dealer display 217 is located in the center. Displays 210 preferably include an array of individually controllable light bars. The light bars for displays 210 preferably extend along the front face of curb 209 and also along the upper surface 206 to thereby provide good visibility for the dealer from above and players from the front. As shown, each display light bar can be individually lit to indicate from one to five consecutive jackpot hands. The display is unlit when there has not been a jackpot hand in the preceding play for which the player still has credit. In the case of dealer display 217 the light bars can be lit to indicate one to five consecutive dealer bust hands.

Central module 205 also preferably includes player keys 223 and dealer key 224. Keys 223 and 224 are similar in function to keys 26 and 28 described above. Keys 223 and 224 are conventionally positioned for activation by the dealer just after handling cards to and from the players.

Central module 205 is also preferably provided with a deposit slot 242 which allows the dealer to deposit cash used by players to purchase gaming chips. Deposit slot 242 communicates through the central module to provide money pass through into a corresponding deposit slot (not shown) formed through the blackjack table 10.

As shown, the preferred gaming system 200 further includes a port side module 202. Port side module 202 is adapted to connect with a back wall 245 of the central module 205. Side module 202 connects with the central module in a manner which places the side module in an upstanding orientation. This is advantageously accomplished using fasteners (not shown). Side module 202 is also supported upon the surface of gaming table 20. The outboard end of the side module can also be attached to the table using a suitable clip (not shown) which slides under the padded perimeter of the blackjack table.

Gaming system 200 also preferably includes a starboard side module 203. Starboard side module 203 is similar in construction to port side module 202 in several respects. It is preferably fastened to the central module and is supported upon the gaming table in similar fashions. It additionally includes a dealer control panel 251 having a series of dealer controls 252. Dealer controls 252 include the key switches, similar to switches 30 and 32 described above. Additional controls are shown merely to suggest possible controls used to operate the preferred side panel displays described below.

Side modules 202 and 203 also preferably include side panel displays 254 mounted upon the front faces 246 of the side modules. Side panel displays can be printed material or electronic displays of fixed or alterable display capabilities. One embodiment includes variable electronic displays which can be scrolled to present a moving message. Another embodiment shows fixed information indicating betting ranges for the blackjack table. A still further embodiment allows a combination of fixed information on table betting ranges coupled with a scrolling or flashing display sign which presents an attracting message designed to bring players to the table. Other alternative display modes are also possible. The details of particular displays 254 will vary dependent upon the particular commercially available display chosen.

The front faces 246 of side modules 202 and 203 are also advantageously provided with printed material dispensers 260 which hold printed rule pamphlets 261. Rule pamphlets 261 advantageously present information about the particular jackpot amounts and sequential event combinations which pay jackpots at the particular blackjack table involved.

Gaming system 200 is particularly advantageous in providing a add-on or retrofit gaming system which can be brought to an existing blackjack table and be fitted thereon with minimal expense. Once fitted, the blackjack table can then be used to perform the novel gaming methods according to this invention.

FIG. 13 shows a further alternative embodiment of gaming system 300 similar to system 200. In the embodiment of FIG. 13 the central module is configured as an annular embankment or curb 301 which extends partially around the dealer position. The central modules is constructed as an annular curb band or ring. An infield area 302 is within the curb, and is open to expose the blackjack tabletop surface 12. The light bar displays 210 are mounted upon the annular curb-shaped central module. This construction does not require a slot 242 but instead allows a similar slot 343 already formed through the tabletop to function without impedance. Otherwise system 300 is similar to system 200 and similar reference numbers have been used in both embodiments for similar features.

FIG. 14 shows a preferred game system 400 according to this invention. Game system 400 has numerous components which are similar to other systems described above, specifically game systems 10, 200, and 300.

Table 410 is similar to table 10 but is provided with a tabletop playing surface 412 which has a special design and marking arrangement which works in conjunction with a game system central module 405 which is centrally located upon the playing surface at a central module rest location 415. Table 410 has six non-dealer player positions 421–426 and a dealer position 427. Other numbers of players are possible. Tabletop 412 has player zones 431–436 which are associated with player positions 421–426, respectively. Each player zone is demarcated by player zone boundary markings 413. The space 417 immediately in front of central module 405 is left open or can be used for prominent presentation of the game name or other information.

Adjacent to each player zone are visual leader designs or markings 441–446 which act as a direct visual tabletop indicators between the player position and associated player zone, and the corresponding player count displays 451–456 which are arranged along the sides of module 405. As shown, the visual leader markings 451–456 comprising arcuate bands which extend from the heads of each player zone toward the central module. The visual leader markings 451–456 are most preferably colored in contrast to the other portions of the player surface, and in manners which are different from the adjacent visual leader marking bands. FIG. 15 shows the visual leader bands shaded for a specific color combination, but numerous alternative color schemes are possible. Visual leader markings 451–456 also preferably include leader symbols 458 which as shown are star designs which help to direct the viewer's attention along the leader bands toward the player count displays.

Each player zone 431–436 is preferably provided with a chip betting area 438. Betting areas 438 are used to specifically provide an area of the playing surface upon which chips being bet must be placed.

Table 410 also includes a chip rack 418 and bill deposit slot 442.

FIG. 15 is similar to FIG. 14 with the additional presentation of betting chips 439 within chip betting areas 438. Also shown are playing cards 449. The visual leader markings 451 and 456 are shown shaded for the color red, markings 452 and 455 are shown shaded for the color purple, and markings 453 and 454 are shown shaded for the color green. This provides additional visual contrast between the different players' markings.

FIGS. 16–19 show the preferred central game system module 405 in greater detail. Games system module 405 has a front 401 which is orientated toward the player side of table 410 during normal use. Module 405 also has a rear 402 which is normally oriented toward the dealer position 427. A first side 403 and second side 404 extend between the front and rear of the module. A top surface 406 is advantageously provided with player keys 471–476 which correspond to player positions 421–426, respectively. Player keys 471–476 are used to increment the player count value stored in the associated player counter. As shown there is one player key which is depressed to increment one player counter. Alternatively, more than one player counter may be used in particular circumstances to count differing types of player jackpot tally events. However, for purposes of operational simplicity, the single counter, single player key construction is most preferred. Player jackpot tally events are subject to various rules of play but will typically include a player blackjack or similar winning hand; a dealer blackjack hand may be used as an equivalent, as indicated below; or a player receiving a pair of ten-count cards may also result in a player jackpot tally event.

Module 405 also preferably includes a first dealer key 477. As shown, the first dealer key 477 is used to increment the player counters. This action causes the dealer playing event, such as a dealer natural or blackjack hand, to function as a player jackpot tally event. Thus each player in the hand receives a incremental addition to his or her player count value due to the dealer having received a blackjack hand or other triggering event as determined by the rules of play. Alternatively, the dealer tally event can be used to increment a separate dealer blackjack counter (second dealer counter) which is distinct from the individual player counters.

Module 405 further preferably includes a second dealer key 478. As shown, the second dealer key 478 is used to increment the dealer bust counter (first dealer counter) which registers the dealer jackpot tally event count. The dealer receives a incremental addition to his or her dealer jackpot count value due to the dealer having received a bust hand or other triggering dealer jackpot tally event as determined by the rules of play.

Module 405 still further includes a log key 479 which functions as an end-of-hand device which is depressed or otherwise activated at the end of each hand. Under typical play the activation of the end-of-hand log key 479 will result in the zoning processes described above being effected to reset the counters which should be reset to zero under the conditions present in that game and given the specifics of play. Log key 479 also translates temporary events to cause the appropriate player counters to be incremented in preparation for the hand.

Module 405 also includes a control key switch 480 which is adapted to receive a security key used by a dealer, pit boss or floor manager to reset or backup play of the module.

Module 405 further includes the player count displays 451–456 along the sides of the module. The player count displays shown are advantageously discrete LED (light emitting diode) elements 459 which light up as individually controlled. The player count displays indicate player jackpot count values of 0, 1, 2, 3, 4, or 5 as shown by turning on the same number of elements. Each player count display is advantageously rendered more recognizable by an optional player count display border 409. When module 405 is placed on the table, the player count display borders 409 preferably are positioned to align with the borders between the adjacent visual leader bands 441–446 to further aid in the easy interpretation of play by all viewers.

Figure 20:
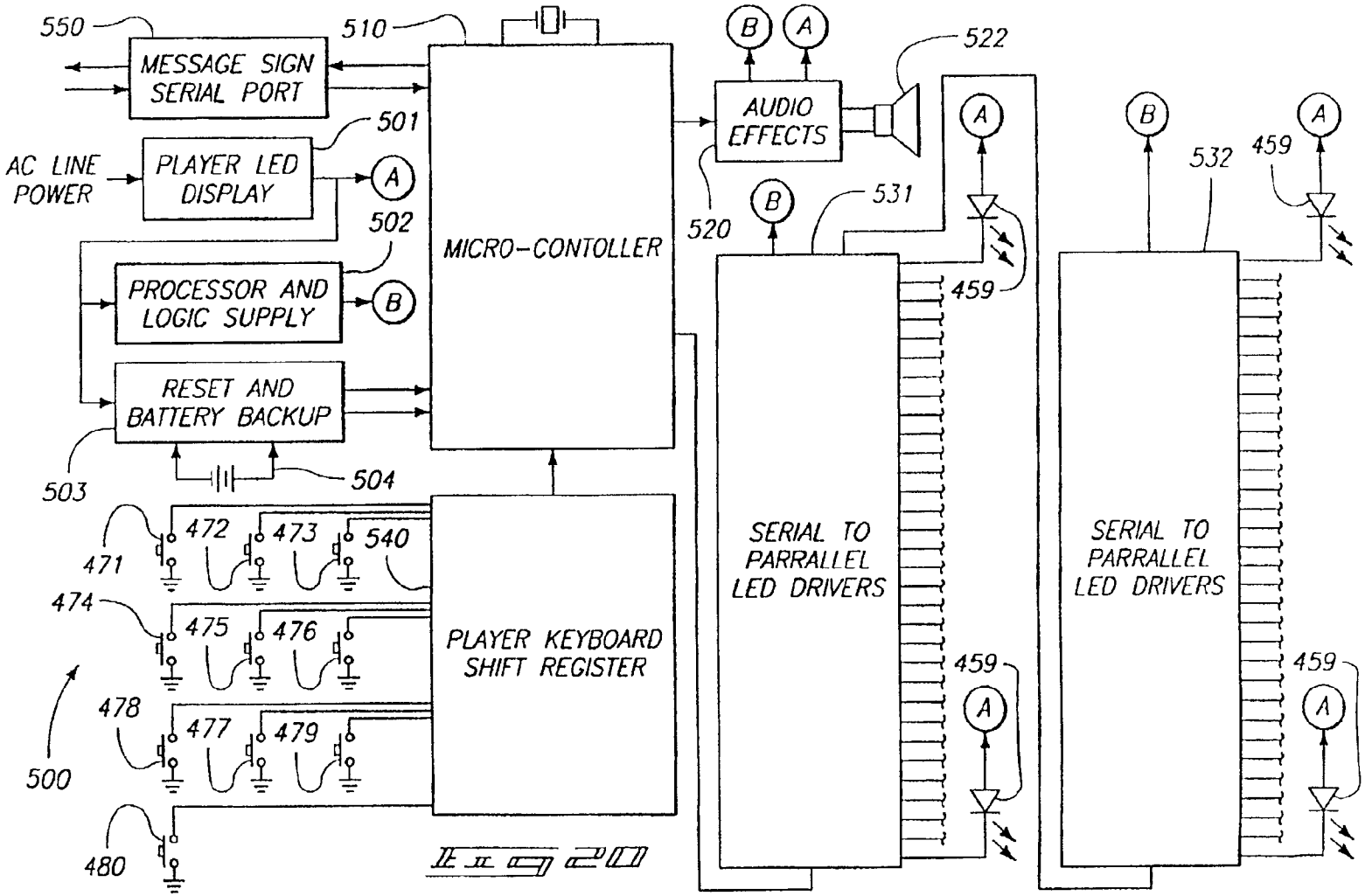
FIG. 20 is a schematic block diagram illustrating a preferred electronic construction used in the circuitry included as part of the game system module of FIG. 16.

FIG. 20 shows an electronic schematic block diagram of a preferred electronics circuitry 500 used in module 405. The preferred electronics include a main power supply 501 which is connected to a supply of alternating current power, such as a typical 110 volt AC power source. Alternatively, the AC line electrical power source and power supply 501 can be replaced by a suitable battery power source.

The output from power supply 501 preferably produces a −12 volt direct current (DC) output. This output is used to power other portions of the circuit as indicated at the symbol A. The output of power supply 501 is advantageously coupled to a second power supply 502 which produces an output which is preferably a −5 volt direct current power source indicated by the symbol B. The output of power supply 501 is also preferably coupled to a third power circuit 503 which provides integration of a battery backup circuit powered by battery 504 to preserve data during periods of power interruption. Uninterruptable 5 volt DC power is supplied to a micro-controller 510 via circuit 503. Circuit 503 also provides a reset signal to micro-controller 510 in response to a reset switch (not shown).

Micro-controller 510 is provided with a clock crystal 511 which allows the micro-controller to maintain an internal clock. Micro-controller 510 has an audio output signal which is electrically connected to an audio effects subcircuit 520. Audio effects subcircuit 520 provides audio output to a speaker 522 which provides chimes or other desired audio effects to attracts patrons, signal a winning jackpot, or provide other sounds as desired.

Micro-controller 510 is connected to two serial-to-parallel LED driver circuits 531 and 532. The outputs from circuits 531 and 532 are connected to the player count indicators 459 for displays 451–456.

Micro-controller 510 receives signals from a key pad shift register 540. Key pad shift register 540 is connected to the key switches 471–480. Signals from shift register 540 are processed in micro-controller to provide the indicated counting and zeroing functions indicated hereinabove.

Micro-controller 510 is also advantageously connected to a serial port 550 which can be used to interface the central module 405 with an ancillary display sign (not shown) but similar in construction and function to displays 22, 202, and 203 explained above.

Figure 21:
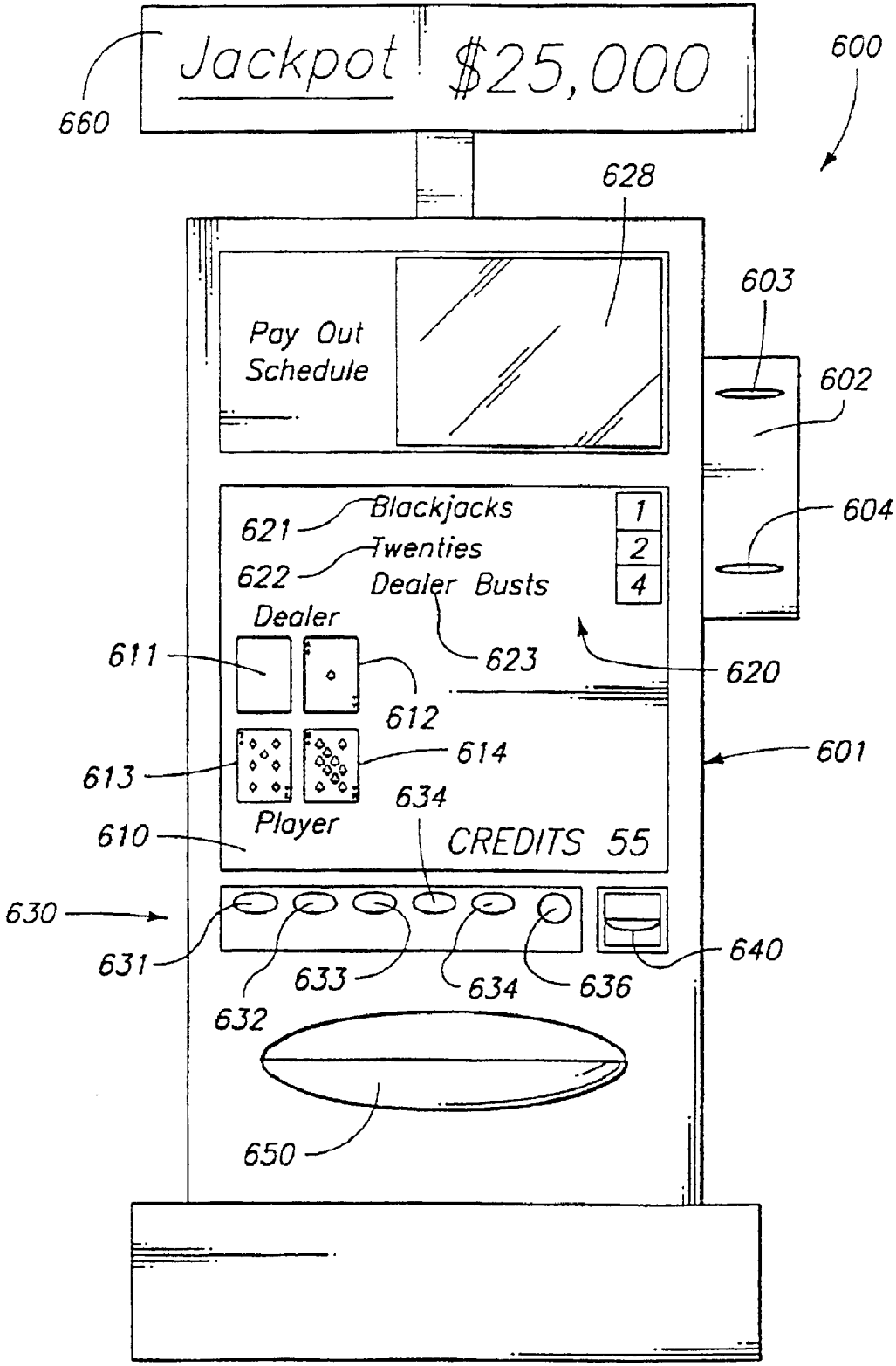
FIG. 21 is a front elevational view of a preferred video card game apparatus incorporating a novel game system according to this invention.

FIG. 21 shows a further card gaming system 600 which functions in accordance with this invention. Gaming system 600 is adapted to perform the novel methods for playing card games, such as blackjack, as described herein. Gaming system 600 includes a video card game machine 601. Machine 601 includes a side unit 602 which includes a bill validator 603 and a player account and identification card reader 604. Bill validator 603 reads monetary bills and upon validation accepts the bills and posts credits to the player's account in the gaming machine. Player account and identification card reader 604 is a card reading device, such as an automated magnetically coded credit or bus-ticket-type card reader, well known in the art. Reader 604 is used to either provide an account balance to the gaming machine against which a player can charge bets, and/or provide user identification for verification and user tracking information used by the casino to monitor against gaming fraud and to better understand customer behavior and desires. Video gaming machine 600 also includes a coin insert or feed 640 which is used to insert coins in lieu of the bill validator 603 or an account card read by reader 604.

Gaming system 600 further preferably includes a main display 610 which is preferably a cathode ray tube, liquid crystal display, or similar electronically controlled display. Display 610 is used to display various information either to attract a player or for use during the play of the game. In particular for the playing of blackjack, the main display is used to show dealer cards 611 and 612 and player cards 613 and 614. Card 611 is the dealer down card and is shown blackened to indicate it is face-down. Card 612 is the dealer's up card and is shown face-up. Both player cards 613 and 614 are shown face-up.

In the upper portion is a jackpot counter display section 620 forming a part of the main display 610. Jackpot counter display has three counters pictured. The upper line 621 indicates the number of player first jackpot tally events are credited. In this case the upper line indicates the number of blackjack hands which the player has either received or been credited due to blackjack by the player or the dealer. The second line 622 of the jackpot display indicates the number of twenty-count hands received by the player which qualify as second jackpot tally events. The third line 623 indicates the number of dealer busts which are included in the dealer first jackpot tally events. In the preferred form the jackpot tally events which led to the indicated counts shown in lines 621–623 are due to qualifying events occurring in a sequential manner, most preferably in consecutively sequentially hands. Alternatively, the rules of play may make various sequential patterns qualifying events for purposes of being counted in one or more of the jackpot tally event counters. For example, consecutive sequences of any particular card hands may lead to events being tallied in the jackpot tally counters. Consecutive 20-count hands, consecutive 19-count hands, consecutive 18-count hands, multi-card (more than 2 card) 21-count hands, blackjacks of a specific suit, red-suit blackjacks, black-suit blackjacks, and many other combinations of cards which when they occur in a defined sequential pattern over a series of played hands can lead to a jackpot threshold being met and the player receiving a jackpot payout. The sequential occurrence allows the gaming establishment to adjust the payout schedule to include both extremely high payouts for very infrequent events, and when desired or in the alternative relatively smaller jackpot payouts with greater frequency. This greatly enhances the appeal of the game to the player.

Gaming machine 600 also preferably includes a payout schedule 628. Payout schedule 628 is advantageously positioned upon the front of gaming machine 600 above the main display 610. Payout schedule 628 can either be a printed posting or can be information displayed upon a second electronic display, similar to main display 610. It is alternatively possible for the payout schedule and other information to be provided upon a portion of the main display. The main display may be made larger to accommodate the various information presented thereon.

In the preferred video blackjack machine 600 there is typically a single non-dealer player. Machine 600 is equipped with a series of option keys 630 which are advantageously arranged beneath the main display. Alternatively, the option keys can be provided in the form of a touch screen display having touch control options which are activated by bring a person's finger into proximity or contact at the appropriate location upon the display screen. As shown, the card gaming machine 600 is provided with key switches 631–636 which have specific functions. As shown, key 631 is used to hit the player so that another card is dealt to the player. Key 632 is used to indicate the player's choice to stand and not receive further cards. Key 633 is used to indicate the player's choice to double. Key 634 is used to split the players initial two cards and play two hands simultaneously. Key 635 is used to instruct the machine to payout any accumulated winnings. Key 636 is used to start the deal of another card hand.

Video card machine 600 also preferably includes a payout tray 650 into which is deposited coins or other winnings in response to the player's choice to payout, as indicated by activating key 635.

Video card gaming machine 600 also advantageously includes an attraction display 660. Display 660 is used to indicate a jackpot amount which can be machine-specific and determined in part by rules of play which are also specific to the particular machine being used.

Gaming machine 600 is constructed using previously known video card gaming machine technology adapted as needed to achieve the features and functions indicated herein. Such gaming machines are known from prior development and are commonly used in connection with video poker, video blackjack, and other games. Such machines are suitably programmed according to this invention so as to provide the features described herein and to perform the novel methods and related processes used in this invention. Current machines have programming capability which will allow the novel games of this invention to be played thereon. Such play can be scheduled either with an ante by the player, or without an ante depending upon the desires of the gaming establishment. It is also possible to have the jackpot features of this invention apply during some games and not during others depending upon the bet placed by the player or by other optional choice.

In another preferred form of the invention the methods of playing are modified to provide another aspect of play which is herein termed a special or showdown round. There can be a singular special round or multiple special rounds. The special or showdown round is initiated by first determining whether any player has a player count value which meets or exceeds a special round player threshold amount, in which case such player becomes a special player. The status as a special player allows the special player to play in a special round or rounds of cards to be played. The particular count or other requirements for the special round player threshold will depend upon the ante, special round payouts, and other parameters of the game needed to provide a profitable operation. If profit is not the only consideration, then other factors may determine the exact special round threshold amount. In the preferred methods, the count of a player's counter indicating the number of consecutive jackpot tally events will be considered in determining whether the player has reached the special round threshold. For example, a player may obtain a player count value on the player's associated player counter which equals or exceeds 5. In such an example the player would be considered a special player. Alternatively, the special round threshold could be reached using other types of counted events on a separate and distinct special round counter. However, such an alternative approach complicates the methods and they are not included in the most preferred methods used in table game versions. Video systems, such as system 600, easily can implement this type of complexity.

When a player meets or exceeds the special round threshold amount, the dealer performs by declaring that a special round threshold has been attained. In the preferred methods the special round or rounds will be played immediately after the dealer declares that a player has reached the special round threshold amount. Alternatively, the attainment of the special round threshold amount could conceivably result in a special round of play which could be delayed in some instances. However, immediate play of the special round or rounds is preferred.

In the at least one special round, a variety of rules of play can be implemented. Most typically the rules normally considered fundamental to the preferred game being played, e.g. blackjack, are continued and special jackpot or winnings rules will apply. However, as the preferred embodiment described below will indicate, the rules changes associated with the special round can be fundamental and deviate outside normal rules.

In the preferred methods of this invention the special round involves suspending play for one or more of the players other than the special player. Typically, all players except the special player and dealer will be suspended until after the special round is completed. Alternatively, the dealer can also suspend play to the dealer; although this form is not the most preferred. It is also further alternatively possible for two players to simultaneously reach the special round threshold at the same time. In this case multiple special rounds can be done sequentially, or other modified rules could apply to allow simultaneous play by two special players.

After the dealer has declared a special round, the special player then engages in the play of the special round or rounds. In a preferred form of this invention, the special round involves playing a single round of blackjack, which preferably involves playing a single round of blackjack with the special player simultaneously playing multiple hands. The preferred special round can be a single round wherein the special player simultaneously plays the entire table (except for the dealer), for example 6 or 7 hands. Alternatively, the equivalent number of hands could be played consecutively in a series of special rounds. It is also contemplated that a series of special rounds could be dealt each providing the special player with one or more hands which are played simultaneously.

The hand or multiple hands played by the special player during the special round or rounds, are typically played in a regular fashion with most regular rules of the casino game applying. However, it is preferred that the jackpot amounts are fixed for the special round and it is anticipated that no bet or ante is required for the special round. Rather, the player receives the special round as a payoff or award for having reached the special round threshold amount. In this regard the special round acts as part or all of the player jackpot bonus for reaching a particular threshold player count value.

The methods of this invention can further include paying or otherwise awarding a special round jackpot at the conclusion of the special round or rounds. The special round jackpot is preferably dependent upon the number of special round qualifying events which have occurred. For example the methods can advantageously be practiced with the player jackpot tally events being a natural or hand count of either 20 or 21. Either of these can for convenience be referred to as a "highhand". Similarly, the special round can be practiced such that the player receives a special round player event count which is equal to the number of special round qualifying events received by the player during the special round or rounds. The special round jackpot award for a special round or rounds would thus be dependent upon the special round player qualifying event count. For example, if the special player was dealt six hands during a special round, and the player had three hands which counted twenty and three hands that counted seventeen, then the special player's qualifying event count would be three.

Special round jackpot payouts could be scheduled as follows: Zero high hands—$25; one high hand—$25; two high hands—$25; three high hands—$125; four high hands—$200; five high hands—$500; six high hands—$12,500. Since the special player is only playing six hands in the single special round, then only six high hands are possible.

To provide better play, and because of the preferred use of the special round as a jackpot bonus, it is also preferred that the special round carries with it some automatic cash or prize jackpot award. This award or special round automatic jackpot will be awarded as a result of playing the special round or rounds. For example, if the player count has reached a value of five and a player is declared special and a special round is played, then a minimum jackpot might be $25. Such a minimum special round jackpot amount would, for example, apply if the special player did not receive a high hand for any of the multiple hands being played by the special player during the special round or rounds.

Methods according to this invention can further advantageously include playing the special round with both the special player and dealer being dealt hands. In such a preferred form of the invention, the special round jackpot or payout schedule can be determined in-part by considering the hand or hands of the dealer which occur during the special round or rounds being played. This is advantageously done by determining a dealer special round qualifying event count. For example, the dealer can have one or more dealer special round qualifying events. Such dealer special round qualifying events can be associated with a particular hand or hands, such as a dealer bust hand. Alternatively, it may be possible to include other dealer special hand outcomes in addition to or in lieu of a dealer bust, such as dealer blackjack natural hands. The particular dealer special round qualifying events allowed will affect the special jackpot payout schedule. In the proposed payout schedule given above, the dealer bust hands are only considered in counting the number of dealer special round qualifying events. The schedule also is based upon a single special round with multiple hands simultaneously played by the special player. Accordingly, the dealer special round qualifying event count is one if there is a bust and zero if the dealer does not bust. The payout schedule given above can be doubled for all player special round qualifying event counts, should the dealer have a bust hand and have a dealer event count of one. Other approaches are alternatively possible using a simplified or more complex matrix of events, either special round player events or special round dealer events.

In another preferred form of the invention, the suspension of one or more players during the special round can reduce interest on the part of the players who have been suspended. To offset this effect, it is desirable for the methods to also include awarding a suspended player or players a suspended player award if the special player or players receive an award. This secondary or suspended player award can be variable dependent upon the jackpot the special player wins. This maintains interest of the suspended players and places them in the position of also being an effective winner along with the special player but the awards will be significantly smaller.

The methods according to this invention can be utilized in various parts by combining one or more methods with other aspects or methods as taught herein. For example, the special round or rounds can either not be added to other methods described above, or the special round or rounds in various implementing forms can be added as an award for reaching a particular player count value. Similarly, the special round methods can be utilized on a video card game machine, such as machine 600.

We claim:

1. A method for playing a card game involving a dealer and at least one player, comprising the following steps:

establishing a predetermined player jackpot tally event wherein said predetermined player jackpot tally event is a predetermined outcome of a player's card hand;

establishing a predetermined dealer bust event wherein said predetermined dealer bust event is a predetermined outcome of a dealer's card hand;

providing a player jackpot tally event status display for each player comprising a numeric LED readout visible to all players and the dealer;

providing a dealer bust event status display comprising a numeric LED readout visible to all players and the dealer;

starting a round of play by dealing a card hand to each player and to the dealer;

determining whether a player jackpot tally event has occurred for each player;

determining whether a dealer bust event has occurred for the dealer;

incrementing a player's player jackpot tally event display if said player's card hand is a predetermined player jackpot tally event;

incrementing said dealer bust event display if said dealer's card hand is a predetermined dealer bust event;

continuing another round of play and incrementing each player jackpot tally event display and dealer bust event display as recited above, and while continuous rounds are played rewarding any player whose player jackpot tally event display has exceeded a predetermined player jackpot tally event threshold;

rewarding all players if said dealer bust event display has exceeded a predetermined dealer bust event threshold;

zeroing any said player jackpot tally event display when the associated player's card hand did not increment the player's said jackpot tally event display;

zeroing said dealer jackpot tally event display when the dealer's card hand did not increment said dealer bust event display.

2. The method according to claim 1 wherein the incrementing steps are performed by pressing a membrane switch located proximate to each player and to the dealer.

3. The method according to claim 1 wherein a plurality of predetermined jackpot tally event thresholds are included, increasing in value as said player jackpot tally event display is incremented.

4. The method according to claim 1 wherein a plurality of dealer bust events are included, increasing in value as said dealer bust event display is incremented.

5. The method according to claim 1, wherein said rewarding steps involve providing at least one special round having modified rules.

6. The method according to claim 1, wherein said predetermined player jackpot tally event is a "natural" blackjack.

7. The method according to claim 1, wherein said predetermined dealer bust event occurs when the dealer's hand exceeds 21 points.

8. The method according to claim 1, wherein zeroing steps are accomplished by a conventional end-of-hand poker chip slide containing a sensor or switch activated by the dealer deposition losing player's antes.

*9. A method for playing a casino card game capable of involving multiple players, comprising:*

*conducting play of a first casino card game about a gaming table according to first game rules associated with the first casino card game;*

*establishing at least one predetermined special round threshold event associated with play of the first casino card game which acts as a trigger for conducting play of at least one special round game by at least one special player;*

*suspending play of said first casino card game at said gaming table upon occurrence of said at least one predetermined special round threshold event;*

*initiating play of said at least one special round game at said gaming table after said suspending step with said at least one special player;*

*conducting said at least one special round game according to special round rules associated with play of the at least one special round game;*

*paying a special round bonus award to said at least one special round player if the rules of the at least one special round game are met during conduct of said at least one special round game;*

*awarding any players suspended from the special round game a suspended player award as provided for according to rules of the at least one special round game.*

*10. A method according to claim 9 wherein said awarding step makes any suspended player award conditional upon paying a special round bonus award to the at least one special player.*

*11. A method according to claim 9 wherein said awarding step makes any suspended player award variable dependent upon a special round bonus award to the at least one special player.*

*12. A method according to claim 9 wherein the special round includes play by the special player of a plurality of hands simultaneously.*

*13. A method according to claim 9 wherein the at least one special round threshold event includes a plurality of events which are involved in normal play of the first casino card game.*

*14. A method according to claim 9 wherein the at least one special round threshold event includes a plurality of consecutive events which are involved in normal play of the first casino card game.*

*15. A method according to claim 9 wherein the at least one special round threshold event includes a plurality of consecutive threshold tally events by a player which are involved in normal play of the first casino card game.*

*16. A method according to claim 9 wherein the at least one special round threshold event includes a plurality of consecutive threshold tally events by either a player or a dealer which are involved in normal play of the first casino game.*

*17. A method according to claim 9 wherein the special round game involves play of a single player.*

*18. A method according to claim 9 wherein the special round game involves play of both a player and a dealer.*

*19. A method according to claim 9 wherein the special round game involves play of multiple players.*

*20. A method according to claim 9 wherein the special round game involves play of multiple players and a dealer.*

*21. A method according to claim 9 and further comprising betting during the at least one special round game.*

*22. A method for playing a casino gambling game, comprising:*

*conducting play of a first casino game according to first game rules associated with the first casino game;*

*establishing at least one predetermined special round threshold event associated with play of the first casino game which acts as a trigger for conducting play of at least one special round game by at least one special player;*

*suspending play of said first casino game upon occurrence of said at least one predetermined special round threshold event;*

*initiating play of said at least one special round game after said suspending step with said at least one special player;*

*conducting said at least one special round game according to special round rules associated with play of the at least one special round game;*

*paying a special round bonus award to said at least one special round player if the rules of the at least one special round game are met during conduct of said at least one special round game;*

*awarding any players suspended from the special round game a suspended player award as provided for according to rules of the at least one special round game.*

*23. A method according to claim 22 wherein said awarding step makes any suspended player award conditional upon paying a special round bonus award to the at least one special player.*

*24. A method according to claim 22 wherein said awarding step makes any suspended player award variable dependent upon a special round bonus award to the at least one special player.*

*25. A method according to claim 22 wherein the special round includes play by the special player of a plurality of hands simultaneously.*

*26. A method according to claim 22 wherein the at least one special round threshold event includes at least one event which is involved in normal play of the first casino game.*

*27. A method according to claim 22 wherein the at least one special round threshold event includes a plurality of events which are involved in normal play of the first casino game.*

*28. A method according to claim 22 wherein the at least one special round threshold event includes a plurality of consecutive events which are involved in normal play of the first casino game.*

*29. A method according to claim 22 wherein the at least one special round threshold event includes a plurality of consecutive threshold tally events by a player which are involved in normal play of the first casino game.*

*30. A method according to claim 22 wherein the at least one special round threshold event includes a plurality of consecutive threshold tally events by a dealer which are involved in normal play of the first casino game.*

*31. A method according to claim 22 wherein the at least one special round threshold event includes a plurality of consecutive threshold tally events by either a player or a dealer which are involved in normal play of the first casino game.*

*32. A method according to claim 22 wherein the at least one special round threshold event includes a plurality of consecutive threshold tally events by both a player and a dealer which are involved in normal play of the first casino game.*

*33. A method according to claim 22 wherein the special round game involves play of a single player.*

*34. A method according to claim 22 wherein the special round game involves play of both a player and a dealer.*

*35. A method according to claim 22 wherein the special round game involves play of multiple players.*

*36. A method according to claim 22 wherein the special round game involves play of multiple players and a dealer.*

*37. A method according to claim 22 and further comprising betting during the at least one special round game.*

* * * * *